United States Patent
Shafin et al.

(10) Patent No.: US 12,471,165 B2
(45) Date of Patent: Nov. 11, 2025

(54) TDLS DISCOVERY PROCESS FOR MULTI-LINK OPERATION

(71) Applicant: Samsung Electronics Co., Ltd., Suwon-si (KR)

(72) Inventors: Rubayet Shafin, Allen, TX (US); Boon Loong Ng, Plano, TX (US); Peshal Nayak, Plano, TX (US); Vishnu Vardhan Ratnam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 327 days.

(21) Appl. No.: 18/352,562

(22) Filed: Jul. 14, 2023

(65) Prior Publication Data

US 2024/0040644 A1 Feb. 1, 2024

Related U.S. Application Data

(60) Provisional application No. 63/392,793, filed on Jul. 27, 2022.

(51) Int. Cl.
*H04W 76/15* (2018.01)
*H04W 8/00* (2009.01)
*H04W 76/12* (2018.01)

(52) U.S. Cl.
CPC .......... *H04W 76/15* (2018.02); *H04W 8/005* (2013.01); *H04W 76/12* (2018.02)

(58) Field of Classification Search
None
See application file for complete search history.

(56) References Cited

U.S. PATENT DOCUMENTS

| | | | |
|---|---|---|---|
| 2012/0314663 A1 | 12/2012 | Dwivedi et al. | |
| 2022/0174536 A1 | 6/2022 | Kwon et al. | |
| 2022/0183062 A1 | 6/2022 | Seok et al. | |
| 2023/0021262 A1* | 1/2023 | Huang | H04L 1/1614 |
| 2023/0155784 A1* | 5/2023 | Chang | H04W 76/15 370/329 |
| 2023/0371102 A1* | 11/2023 | Shafin | H04W 8/24 |
| 2023/0403753 A1* | 12/2023 | Huang | H04W 76/15 |

FOREIGN PATENT DOCUMENTS

| | | |
|---|---|---|
| WO | 2011/056878 A1 | 5/2011 |
| WO | 2022/032150 A1 | 2/2022 |
| WO | 2022/124979 A1 | 6/2022 |

OTHER PUBLICATIONS

Extended European Search Report for EP 23846950.6 by European Patent Office dated Mar. 17, 2025.

(Continued)

*Primary Examiner* — Brian S Roberts
(74) *Attorney, Agent, or Firm* — BROADVIEW IP LAW, PC

(57) ABSTRACT

A wireless communication network includes an access point (AP) multi-link device (MLD) and a non-AP MLD. In an enhanced multi-link multi-radio (EMLMR) mode, a non-AP MLD may sequentially transmit one or more TDLS discovery request frames to an AP MLD to discover a TDLS peer STA via different EMLMR links. The AP MLD may transmit an initial frame via an EMLMR link to trigger TDLS discovery request frame from the non-AP MLD.

20 Claims, 17 Drawing Sheets

(56) References Cited

OTHER PUBLICATIONS

International Search Report & Written Opinion for PCT/KR2023/010715 by Korean Intellectual Property Office dated Oct. 20, 2023.
Patil, Abhishek et al. "Resolution for CIDs related to TDLS operation with MLO (CC34/CC36)", IEEE 802.11-21/0240r10. Wireless LANs. Feb. 11, 2021.
Lu, Yuxin et al. "CC36 CR for EMLMR Links", IEEE 802.11-21/1840r4. Wireless LANs. Oct. 10, 2021.
IEEE P802.11be-D3.2 "Part 11: Wireless LAN Medium Access Control (MAC) and Physical Layer (PHY) Specifications—Amendment 8: Enhancements for extremely high throughput (EHT)" May 2023, 1055 pgs.
IEEE Std 802.11-2020 "Part 11: Wireless LAN Medium Access Control (MAC) and Physical Layer (PHY) Specifications" IEEE Standard for Information Technology—Telecommunications and Information Exchange between Systems Local and Metropolitan Area Networks—Specific Requirements. Dec. 3, 2020. 4379 pgs.

* cited by examiner

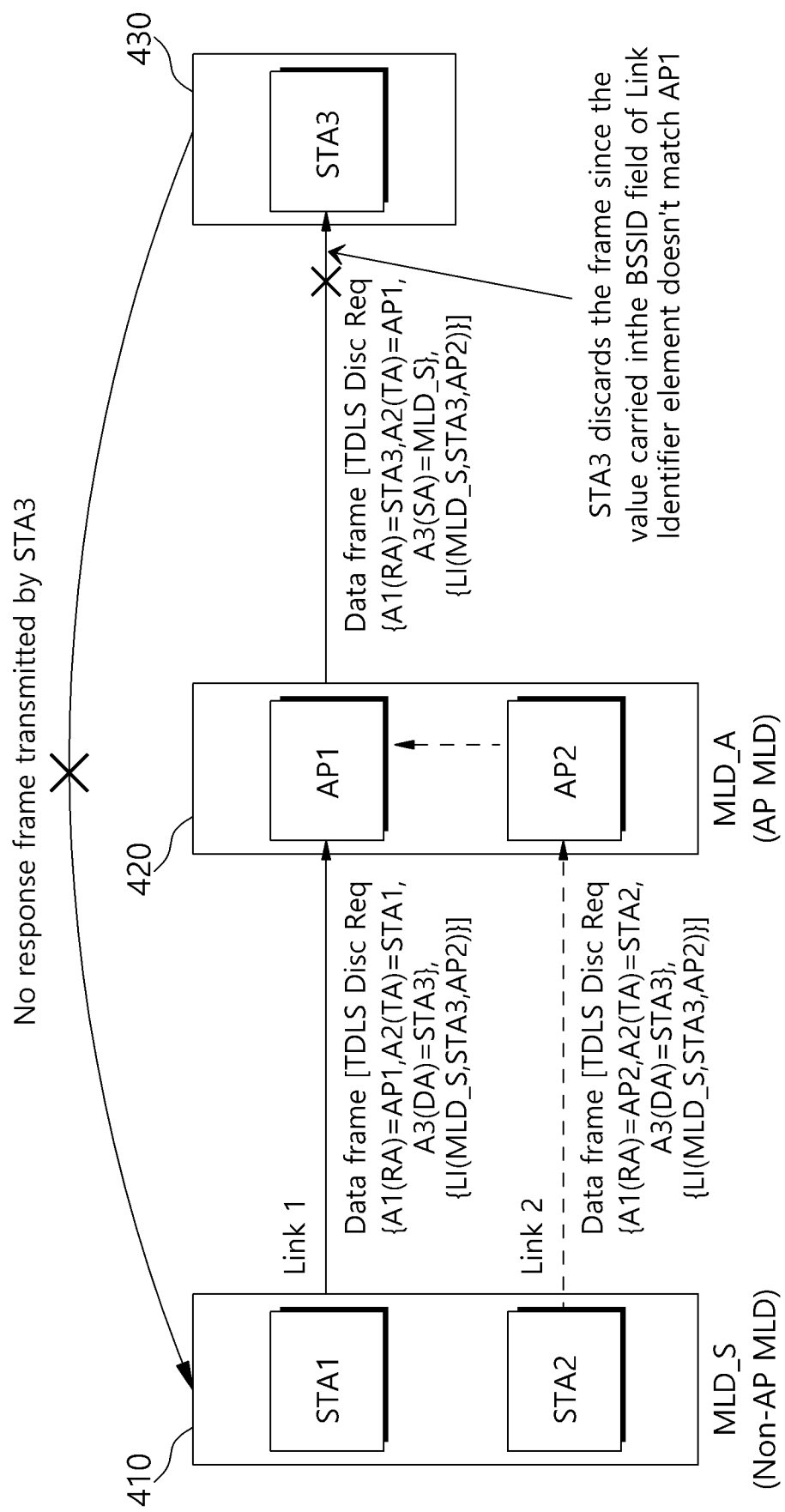

- 910: A non-AP MLD is operating in EMLMR mode and intends to discover and establish TDLS direct link on one of its links
- 920: The non-AP MLD transmits a first TDLS discovery request frame on a first link
- 930: The non-AP MLD transmits a second TDLS discovery request frame on a second link
- 940: When the non-AP MLD has more than two links, the non-AP MLD transmits TDLS discovery request frames on each link sequentially and separately
- 950: The non-AP MLD receives a TDLS discovery response frame on the links on which the non-AP MLD has transmitted the TDLS discovery request frame

TDLS DISCOVERY PROCESS FOR MULTI-LINK OPERATION

CROSS-REFERENCE TO RELATED APPLICATIONS

This application claims the benefit of priority from U.S. Provisional Application No. 63/392,793, entitled "TDLS DISCOVERY PROCESS FOR ENHANCED MULTI-LINK MULTI RADIO (EMLMR) OPERATION", filed Jul. 27, 2022, which is incorporated herein by reference in its entirety.

TECHNICAL FIELD

This disclosure relates generally to wireless communication systems, and more particularly to, for example, but not limited to, multi-link operation for a multi-link device in wireless communication systems.

BACKGROUND

Wireless local area network (WLAN) technology has evolved toward increasing data rates and continues its growth in various markets such as home, enterprise and hotspots over the years since the late 1990s. WLAN allows devices to access the internet in the 2.4 GHz, 5 GHz, 6 GHz or 60 GHz frequency bands. WLANs are based on the Institute of Electrical and Electronic Engineers (IEEE) 802.11 standards. IEEE 802.11 family of standards aims to increase speed and reliability and to extend the operating range of wireless networks.

WLAN devices are increasingly required to support a variety of delay-sensitive applications or real-time applications such as augmented reality (AR), robotics, artificial intelligence (AI), cloud computing, and unmanned vehicles. To implement extremely low latency and extremely high throughput required by such applications, multi-link operation (MLO) has been suggested for the WLAN. The WLAN is formed within a limited area such as a home, school, apartment, or office building by WLAN devices. Each WLAN device may have one or more stations (STAs) such as the access point (AP) STA and the non-access-point (non-AP) STA.

The MLO may enable a non-AP multi-link device (MLD) to set up multiple links with an AP MLD. In the multi-link operation, a non-AP MLD is allowed to discover, authenticate, associate, and set up multiple links with an AP MLD. Each of multiple links may enable channel access and frame exchanges between the non-AP MLD and the AP MLD independently, which may reduce latency and increase throughput.

The description set forth in the background section should not be assumed to be prior art merely because it is set forth in the background section. The background section may describe aspects or embodiments of the present disclosure.

SUMMARY

One embodiment of present disclosure provides a non-access point (AP) multi-link device (MLD) associated with an AP MLD in a wireless network. The non-AP MLD comprises at least two affiliated stations (STAs) and a processor coupled to the at least two STAs. The processor is configured to set up enhanced multi-link multi-radio (EMLMR) links among multiple links between the non-AP MLD and the AP MLD; operate in an EMLMR mode via the EMLMR links with the AP MLD, the EMLMR link including a first link and one or more second links; transmit a first tunneled direct link setup (TDLS) discovery request frame to the AP MLD via the first link, the first link being set up between a first STA affiliated with the non-AP MLD and a first AP affiliated with the AP MLD; sequentially transmit one or more second TDLS discovery request frames to the AP MLD via the one or more second links when the non-AP MLD does not receive a TDLS discovery response frame from a TDLS peer STA in response to previously transmitted TDLS discovery request frame, wherein each second link is set up between a second STA affiliated with the non-AP MLD and a corresponding second AP affiliated with the AP MLD, and each second TDLS discovery request frame is associated with a respective one of the one or more second links.

In some embodiments, the processor is configured to receive an initial frame, from the AP MLD, to facilitate that the non-AP MLD transmits a second TDLS discovery request frame to the AP MLD via a second link.

In some embodiments, the processor is configured to receive a first initial frame from the first AP via the first link; move part or all of transmit (TX) chains and receive (RX) chains of remaining EMLMR links to the first link; and transmit the first TDLS discovery request frame to the AP MLD via the first link.

In some embodiments, the processor is configured to receive a second initial frame from a second AP affiliated with AP MLD via a second link; move part or all of TX chains and RX chains of remaining EMLMR links to the second link; and transmit a second TDLS discovery request frame to the AP MLD via the second link.

In some embodiments, the second initial frame is received from the second AP when a specified amount of time has lapsed since previously transmitted TDLS discovery request frame.

In some embodiments, the processor is configured to transmit a notification message to the AP MLD to request a transmission of the second initial frame when the non-AP MLD does not receive the TDLS discovery response frame from the TDLS peer STA in response to previously transmitted TDLS discovery request frame.

In some embodiments, wherein a fixed number of TX chains and RX chains remain on each of the EMLMR links during the EMLMR mode to receive the TDLS discovery response frame from the TDLS peer STA.

In some embodiments, the second initial frame is received from the second AP when i) the AP MLD receives an indication that the non-AP MLD has completed TDLS discovery process and ii) a specified amount of time has lapsed since the previously transmitted TDLS discovery request frame.

In some embodiments, the processor is configured to receive the TDLS discovery response frame from the TDLS peer STA.

One embodiment of the present disclosure may provide an access point (AP) multi-link device (MLD) associated with a non-AP MLD in a wireless network. The AP MLD comprises at least two affiliated APs and a processor is coupled to the at least two APs. The processor configured to set up enhanced multi-link multi-radio (EMLMR) links among the multiple links between the AP MLD and the non-AP MLD; operate in an EMLMR mode via the EMLMR links with the non-AP MLD, the EMLMR link including a first link and one or more second links; receive a first tunneled direct link setup (TDLS) discovery request frame from the non-AP MLD via the first link, the first link being set up between a first AP affiliated with the AP MLD and a first STA affiliated with the non-AP MLD; route the first TDLS discovery request frame to a TDLS peer STA via a link being set up between the AP MLD and the TDLS peer STA; sequentially receive one or more second TDLS discovery request frames from the non-AP MLD via the one or more second links, wherein each second link is set up between a second AP affiliated with the AP MLD and a corresponding second STA affiliated with the non-AP MLD, and each second TDLS discovery request frame is associated with a respective one of the one or more second links; and route the one or more second TDLS discovery request frames to the TDLS peer STA via the link being set up between the AP MLD and the TDLS peer STA.

In some embodiments, the processor is configured to transmit an initial frame to facilitate that the non-AP MLD transmits a second TDLS discovery request frame to the AP MLD via a second link when the AP MLD receives a TDLS discovery request frame from the non-AP MLD.

In some embodiments, the processor is configured to transmit a first initial frame to the first STA via the first link; and receive the first TDLS discovery request frame from the non-AP MLD via the first link.

In some embodiments, the processor is configured to transmit a second initial frame to the second STA via a second link; and receive the second TDLS discovery request frame from the non-AP MLD via the second link.

In some embodiments, the processor is configured to transmit the second initial frame when a specified amount of time has lapsed since previously received TDLS discovery request frame.

In some embodiments, the processor is configured to receive a notification message to request a transmission of the second initial frame to the second STA.

In some embodiments, the processor is configured to transmit the second initial frame when i) the AP MLD receives an indication that the non-AP MLD has completed TDLS discovery process and ii) a specified amount of time lapses since previously received TDLS discovery request frame.

In some embodiments, the processor is configured to receive an indication that the non-AP MLD has received the TDLS discovery response frame from the TDLS peer STA.

One embodiment of the present disclosure may provide a non-access point (AP) multi-link device (MLD) associated with an AP MLD in a wireless network. The non-AP MLD comprises at least two affiliated stations (STAs) and a processor coupled to the at least two STAs. The processor is configured to set up multiple links between the non-AP MLD and the AP MLD, the multiple link including a first link and one or more second links; operate in an EMLMR mode with the AP MLD; disable the EMLMR mode being operated with the AP MLD when the non-AP MLD intends to discover a tunneled direct link setup (TDLS) peer STA; transmit a first TDLS discovery request frame to the AP MLD via the first link, the first link being set up between a first AP affiliated with the AP MLD and a corresponding first STA affiliated with the non-AP MLD; and sequentially transmit one or more second TDLS discovery request frames to the AP MLD via the one or more second links when the non-AP MLD does not receive a TDLS discovery response frame from a TDLS peer STA in response to previously transmitted TDLS discovery request frame, wherein each second link is set up between a second AP affiliated with the AP MLD and a corresponding second STA affiliated with the non-AP MLD, and each second TDLS discovery request frame is associated with a respective one of the one or more second links.

In some embodiments, the processor is configured to transmit a second TDLS discovery request frame when a specified amount of time has lapsed since previously transmitted TDLS discovery request frame.

In some embodiments, the processor is configured to receive the TDLS discovery response frame from the TDLS peer STA.

BRIEF DESCRIPTION OF THE DRAWINGS

FIGS. 4A and 4B show an example of a TDLS Discovery process in accordance with an embodiment.

FIG. 9 shows an example of a process for a TDLS discovery process in accordance with an embodiment.

Figure 1:
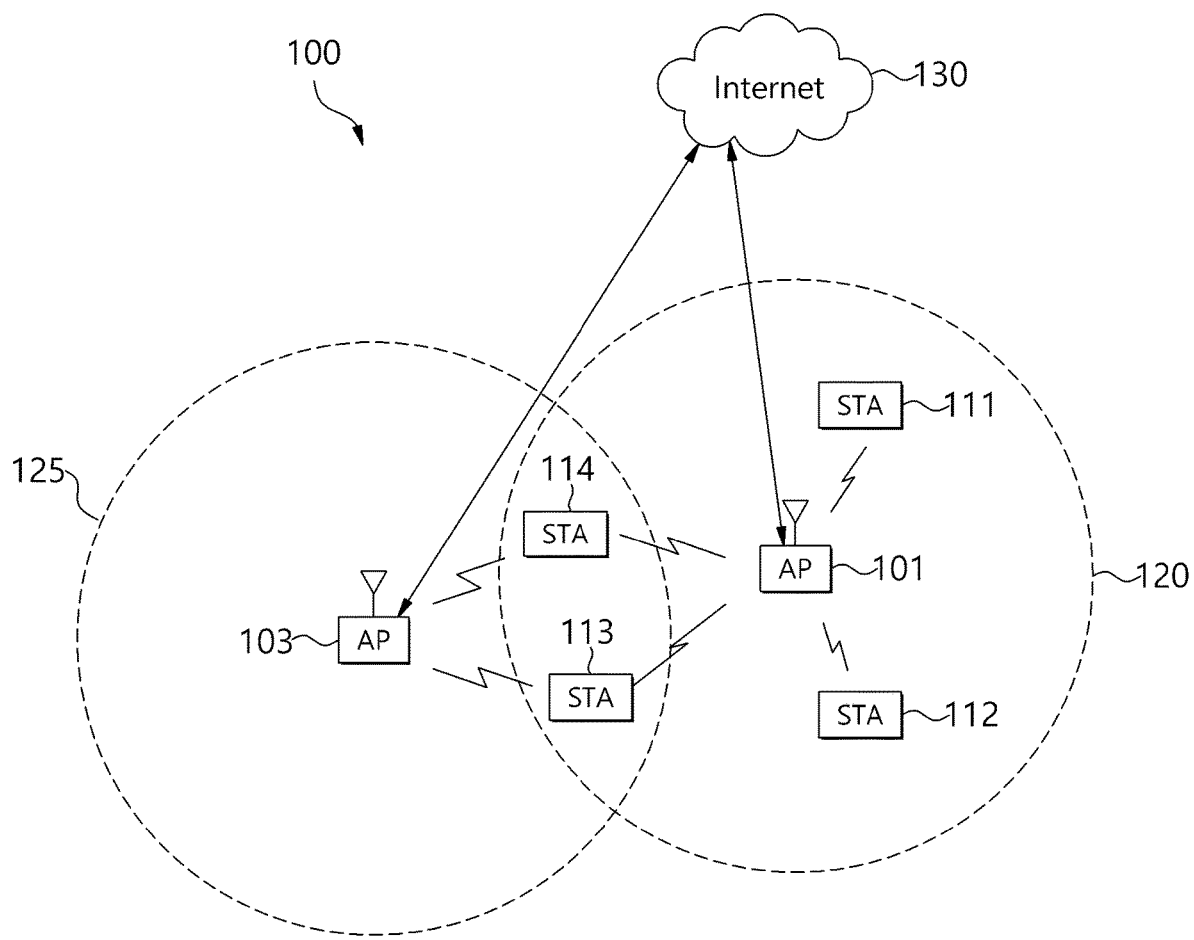
FIG. 1 shows an example of a wireless network in accordance with an embodiment.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below, in connection with the appended drawings, is intended as a description of various implementations and is not intended to represent the only implementations in which the subject technology may be practiced. Rather, the detailed description includes specific details for the purpose of providing a thorough understanding of the inventive subject matter. As those skilled in the art would realize, the described implementations may be modified in various ways, all without departing from the scope of the present disclosure. Accordingly, the drawings and description are to be regarded as illustrative in nature and not restrictive. Like reference numerals designate like elements.

The following description is directed to certain implementations for the purpose of describing the innovative aspects of this disclosure. However, a person having ordinary skill in the art will readily recognize that the teachings herein can be applied in a multitude of different ways. The examples in this disclosure are based on WLAN communication according to the Institute of Electrical and Electronics Engineers (IEEE) 802.11 standard, including IEEE 802.11be standard and any future amendments to the IEEE 802.11 standard. However, the described embodiments may be implemented in any device, system or network that is capable of transmitting and receiving radio frequency (RF) signals according to the IEEE 802.11 standard, the Bluetooth standard, Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), 5G NR (New Radio), AMPS, or other known signals that are used to communicate within a wireless, cellular or internet of things (IoT) network, such as a system utilizing 3G, 4G, 5G, 6G, or further implementations thereof, technology.

FIG. 1 shows an example of a wireless network 100 in accordance with an embodiment. The embodiment of the wireless network 100 shown in FIG. 1 is for illustrative purposes only. Other embodiments of the wireless network 100 could be used without departing from the scope of this disclosure.

As shown in FIG. 1, the wireless network 100 may include a plurality of wireless communication devices. Each wireless communication device may include one or more stations (STAs). The STA may be a logical entity that is a singly addressable instance of a medium access control (MAC) layer and a physical (PHY) layer interface to the wireless medium. The STA may be classified into an access point (AP) STA and a non-access point (non-AP) STA. The AP STA may be an entity that provides access to the distribution system service via the wireless medium for associated STAs. The non-AP STA may be a STA that is not contained within an AP-STA. For the sake of simplicity of description, an AP STA may be referred to as an AP and a non-AP STA may be referred to as a STA. In the example of FIG. 1, APs 101 and 103 are wireless communication devices, each of which may include one or more AP STAs. In such embodiments, APs 101 and 103 may be AP multi-link device (MLD). Similarly, STAs 111-114 are wireless communication devices, each of which may include one or more non-AP STAs. In such embodiments, STAs 111-114 may be non-AP MLD.

The APs 101 and 103 communicate with at least one network 130, such as the Internet, a proprietary Internet Protocol (IP) network, or other data network. The AP 101 provides wireless access to the network 130 for a plurality of stations (STAs) 111-114 with a coverage are 120 of the AP 101. The APs 101 and 103 may communicate with each other and with the STAs using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

In FIG. 1, dotted lines show the approximate extents of the coverage area 120 and 125 of APs 101 and 103, which are shown as approximately circular for the purposes of illustration and explanation. It should be clearly understood that coverage areas associated with APs, such as the coverage areas 120 and 125, may have other shapes, including irregular shapes, depending on the configuration of the APs.

As described in more detail below, one or more of the APs may include circuitry and/or programming for management of MU-MIMO and OFDMA channel sounding in WLANs.

Although FIG. 1 shows one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101 and 103 could communicate directly with the network 130 and provides STAs with direct wireless broadband access to the network 130. Further, the APs 101 and/or 103 could provide access to other or additional external networks, such as external telephone networks or other types of data networks.

Figure 2A:
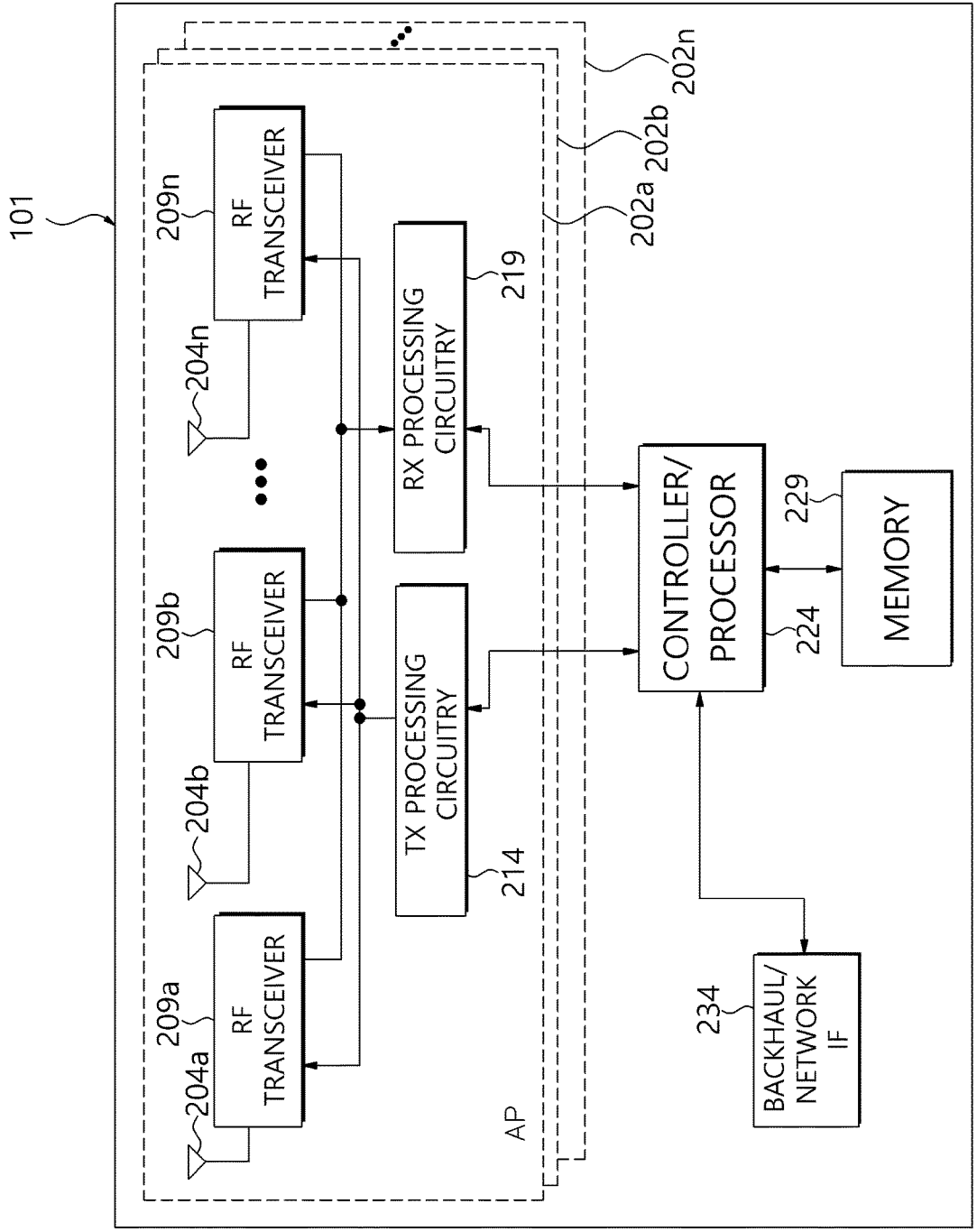
FIG. 2A shows an example of an AP in accordance with an embodiment.

FIG. 2A shows an example of AP 101 in accordance with an embodiment. The embodiment of the AP 101 shown in FIG. 2A is for illustrative purposes, and the AP 103 of FIG. 1 could have the same or similar configuration. However, APs come in a wide range of configurations, and FIG. 2A does not limit the scope of this disclosure to any particular implementation of an AP.

As shown in FIG. 2A, the AP 101 may include multiple antennas 204a-204n, multiple radio frequency (RF) transceivers 209a-209n, transmit (TX) processing circuitry 214, and receive (RX) processing circuitry 219. The AP 101 also may include a controller/processor 224, a memory 229, and a backhaul or network interface 234. The RF transceivers 209a-209n receive, from the antennas 204a-204n, incoming RF signals, such as signals transmitted by STAs in the network 100. The RF transceivers 209a-209n down-convert the incoming RF signals to generate intermediate (IF) or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of uplink signals and the transmission of downlink signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including a combination of DL MU-MIMO and OFDMA in the same transmit opportunity. In some embodiments, the controller/processor 224 may include at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 may include any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for management of channel sounding procedures in WLANs. Although FIG. 2A illustrates one example of AP 101, various changes may be made to FIG. 2A. For example, the AP 101 could include any number of each component shown in FIG. 2A. As a particular example, an AP could include a number of interfaces 234, and the controller/processor 224 could support routing functions to route data between different network addresses. As another example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

As shown in FIG. 2A, in some embodiment, the AP 101 may be an AP MLD that includes multiple APs 202a-202n. Each AP 202a-202n is affiliated with the AP MLD 101 and includes multiple antennas 204a-204n, multiple radio frequency (RF) transceivers 209a-209n, transmit (TX) processing circuitry 214, and receive (RX) processing circuitry 219. Each APs 202a-202n may independently communicate with the controller/processor 224 and other components of the AP MLD 101. FIG. 2A shows that each AP 202a-202n has separate multiple antennas, but each AP 202a-202n can share multiple antennas 204a-204n without needing separate multiple antennas. Each AP 202a-202n may represent a physical (PHY) layer and a lower media access control (MAC) layer.

Figure 2B:
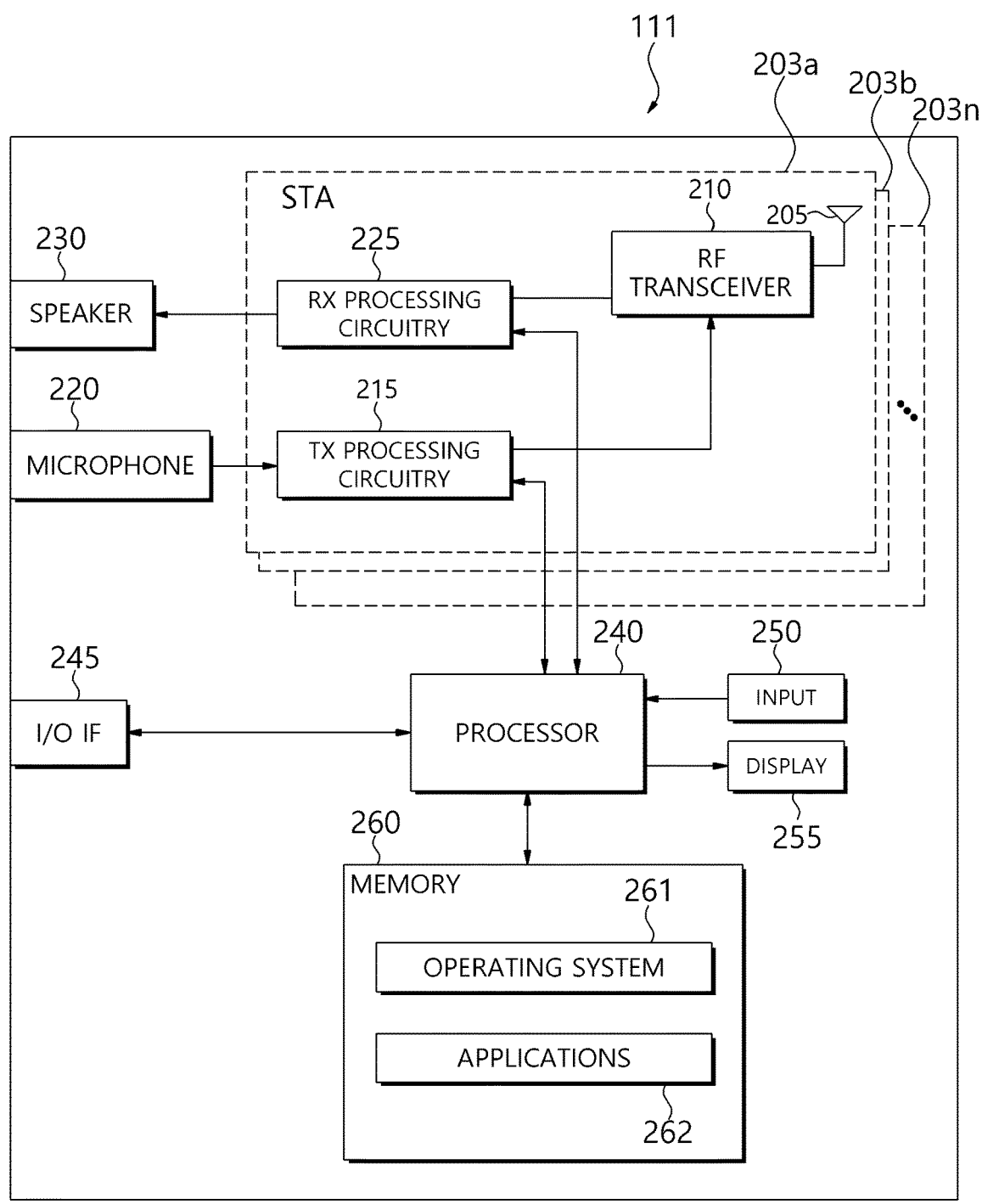
FIG. 2B shows an example of a STA in accordance with an embodiment.

FIG. 2B shows an example of STA 111 in accordance with an embodiment. The embodiment of the STA 111 shown in FIG. 2B is for illustrative purposes, and the STAs 111-114 of FIG. 1 could have the same or similar configuration. However, STAs come in a wide variety of configurations, and FIG. 2B does not limit the scope of this disclosure to any particular implementation of a STA.

As shown in FIG. 2B, the STA 111 may include antenna(s) 205, a RF transceiver 210, TX processing circuitry 215, a microphone 220, and RX processing circuitry 225. The STA 111 also may include a speaker 230, a controller/processor 240, an input/output (I/O) interface (IF) 245, a touchscreen 250, a display 255, and a memory 260. The memory 260 may include an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an IF or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the controller/processor 240 controls the reception of downlink signals and the transmission of uplink signals by the RF transceiver 210, the RX processing circuitry 225, and the TX processing circuitry 215 in accordance with well-known principles. The controller/processor 240 can also include processing circuitry configured to provide management of channel sounding procedures in WLANs. In some embodiments, the controller/processor 240 may include at least one microprocessor or microcontroller.

The controller/processor 240 is also capable of executing other processes and programs resident in the memory 260, such as operations for management of channel sounding procedures in WLANs. The controller/processor 240 can move data into or out of the memory 260 as required by an executing process. In some embodiments, the controller/processor 240 is configured to execute a plurality of applications 262, such as applications for channel sounding, including feedback computation based on a received null data packet announcement (NDPA) and null data packet (NDP) and transmitting the beamforming feedback report in response to a trigger frame (TF). The controller/processor 240 can operate the plurality of applications 262 based on the OS program 261 or in response to a signal received from an AP. The controller/processor 240 is also coupled to the I/O interface 245, which provides STA 111 with the ability to connect to other devices such as laptop computers and handheld computers. The I/O interface 245 is the communication path between these accessories and the main controller/processor 240.

The controller/processor 240 is also coupled to the input 250 (such as touchscreen) and the display 255. The operator of the STA 111 can use the input 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B shows one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

As shown in FIG. 2B, in some embodiment, the STA 111 may be a non-AP MLD that includes multiple STAs 203*a*-203*n*. Each STA 203*a*-203*n* is affiliated with the non-AP MLD 111 and includes an antenna(s) 205, a RF transceiver 210, TX processing circuitry 215, and RX processing circuitry 225. Each STAs 203*a*-203*n* may independently communicate with the controller/processor 240 and other components of the non-AP MLD 111. FIG. 2B shows that each STA 203*a*-203*n* has a separate antenna, but each STA 203*a*-203*n* can share the antenna 205 without needing separate antennas. Each STA 203*a*-203*n* may represent a physical (PHY) layer and a lower media access control (MAC) layer.

Figure 3:
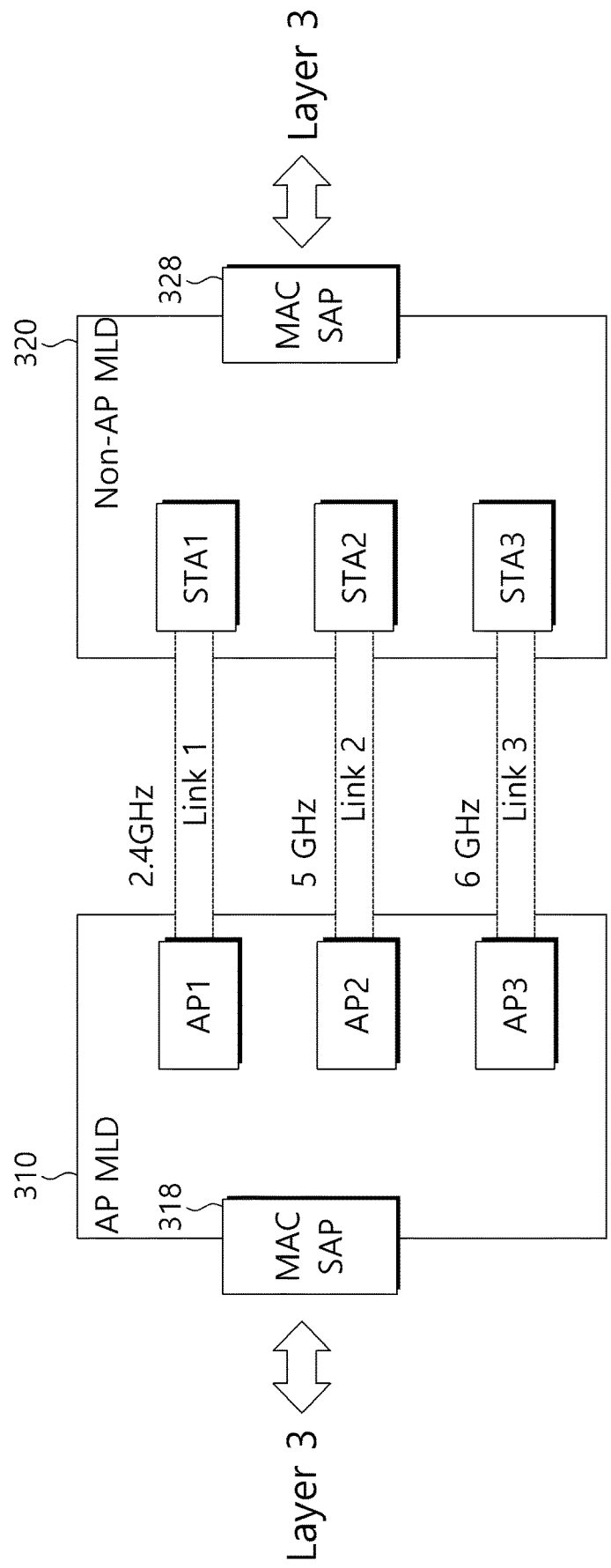
FIG. 3 shows an example of multi-link communication operation in accordance with an embodiment.

FIG. 3 shows an example of multi-link communication operation in accordance with an embodiment. The multi-link communication operation may be usable in IEEE 802.11be standard and any future amendments to IEEE 802.11 standard. In FIG. 3, an AP MLD 310 may be the wireless communication device 101 and 103 in FIG. 1 and a non-AP MLD 220 may be one of the wireless communication devices 111-114 in FIG. 1.

As shown in FIG. 3, the AP MLD 310 may include a plurality of affiliated APs, for example, including AP 1, AP 2, and AP 3. Each affiliated AP may include a PHY interface to wireless medium (Link 1, Link 2, or Link 3). The AP MLD 310 may include a single MAC service access point (SAP) 318 through which the affiliated APs of the AP MLD 310 communicate with a higher layer (Layer 3 or network layer). Each affiliated AP of the AP MLD 310 may have a MAC address (lower MAC address) different from any other affiliated APs of the AP MLD 310. The AP MLD 310 may have a MLD MAC address (upper MAC address) and the affiliated APs share the single MAC SAP 318 to Layer 3. Thus, the affiliated APs share a single IP address, and the Layer 3 recognizes the AP MLD 310 by assigning the single IP address.

The non-AP MLD 320 may include a plurality of affiliated STAs, for example, including STA 1, STA 2, and STA 3. Each affiliated STA may include a PHY interface to the wireless medium (Link 1, Link 2, or Link 3). The non-AP MLD 320 may include a single MAC SAP 328 through which the affiliated STAs of the non-AP MLD 320 communicate with a higher layer (Layer 3 or network layer). Each affiliated STA of the non-AP MLD 320 may have a MAC address (lower MAC address) different from any other affiliated STAs of the non-AP MLD 320. The non-AP MLD 320 may have a MLD MAC address (upper MAC address) and the affiliated STAs share the single MAC SAP 328 to Layer 3. Thus, the affiliated STAs share a single IP address, and the Layer 3 recognizes the non-AP MLD 320 by assigning the single IP address.

The AP MLD 310 and the non-AP MLD 320 may set up multiple links between their affiliate APs and STAs. In this example, the AP 1 and the STA 1 may set up Link 1 which operates in 2.4 GHz band. Similarly, the AP 2 and the STA 2 may set up Link 2 which operates in 5 GHz band, and the AP 3 and the STA 3 may set up Link 3 which operates in 6 GHz band. Each link may enable channel access and frame exchange between the AP MLD 310 and the non-AP MLD 320 independently, which may increase date throughput and reduce latency.

In this disclosure, various embodiments will disclose a TDLS (tunneled direct link setup) discovery and setup process in the multi-link operation.

Figure 4A:
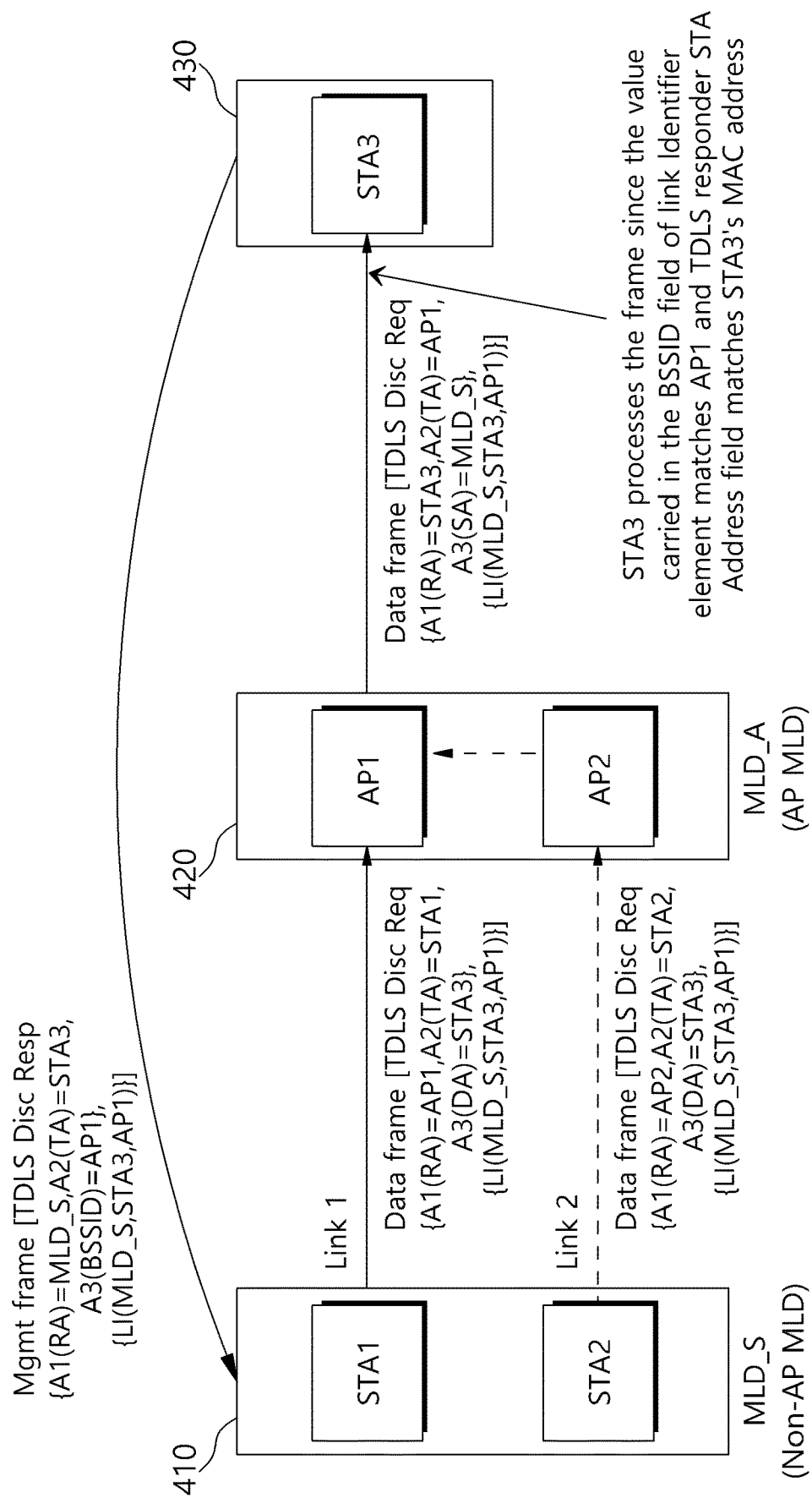

FIGS. 4A and 4B show an example of a TDLS Discovery process in accordance with an embodiment. The TDLS discovery process may be applicable to IEEE 802.11be standard and any future amendments to IEEE 802.11 standard.

In FIGS. 4A and 4B, the TDLS discovery process may be initiated by a non-AP MLD 410. Multiple links (for example, link 1 and link 2) may be set up between the non-AP MLD 410 and an AP MLD 420. The non-AP MLD 410 and the AP MLD 420 may be also referred to as MLD_S and MLD_A, respectively. The non-AP MLD 410 may include a plurality of affiliated STAs, for example STA 1 and STA 2. The AP MLD 420 may include a plurality of APs, for example AP 1 and AP 2. The STA 1 and the AP 1 may operate on link 1, and the STA 2 and the AP 2 may operate on link 2. The STA 1 is associated with the AP 1 and the STA 2 is associated with the AP 2. Furthermore, the STA 3 may be affiliated with a non-MLD 430. Therefore, the STA 3 may not be affiliated with an MLD and may not have the capability to perform the multi-link operation. The STA 3 may be associated with the AP 1 of AP MLD 420.

In this example of FIGS. 4A and 4B, the non-AP MLD 410 may initiate the TDLS discovery process by transmitting two TDLS discovery request frames to the AP MLD 420 because the non-AP MLD 410 is unaware of which link the STA 3 is operating on and whether the STA 3 is an MLD or a STA not affiliated with an MLD. Those TDLS discovery request frames may be data frames. Each of TDLS discovery request frames may include an address 1 (A1) field, and an address 2 (A2) field, an address 3 (A3) field, and a link identifier element (LI). The A1 field may be a receiver address (RA) field, the A2 field may be a transmitter address (TA) field, and the A3 field may be a destination address (DA) field. The link identifier element may include a TDLS initiator STA address field, a TDLS responder STA address field, and a BSSID (basic service set identifier) field. The TDLS discovery request frame shown in FIG. 4A has the BSSID field set to AP 1, while the TDLS discovery request frame shown in FIG. 4B has the BSSID field set to AP 2.

As shown in FIG. 4A, the TDLS discovery request frame may be transmitted from the non-AP MLD 410 to the AP MLD 420 over either link 1 (represented by a solid line) or over link 2 (represented by a dotted line). When the TDLS discovery request frame is transmitted over link 1, the A1(RA) field, the A2 (TA) field, and the A 3 (DA) field of the TDLS discovery request frame may be set to AP 1, STA 1, and STA 3, respectively. Additionally, within the link identifier element of the TDLS discovery request frame, the TDLS initiator STA address field, the TDLS responder STA address field, and BSSID field may be set to MLD_S, STA 3, and AP 1, respectively. Similarly, when the TDLS discovery request frame is transmitted over link 2, the A1(RA) field, the A2 (TA) field, and the A 3 (DA) field of the TDLS discovery request frame may be set to AP 2, STA 2, and STA 3, respectively. Additionally, within the link identifier element within the TDLS discovery request frame, the TDLS initiator STA address field, the TDLS responder STA address field, and the BSSID field may be set to MLD_S, STA 3, and AP 1, respectively. The TDLS discovery request frame may set a To DS (distribution system) subfield of frame control field to 1. The TDLS discovery request frame may be received at the AP MLD 420 by the AP 1 or the AP 2, and the AP MLD 420 may route the TDLS discovery frame to the STA 3 through the AP 1 by setting From DS subfield of the frame control field to 1 and A3 (source address, SA) field to MLD_S. In the routed TDLS discovery request frame, the A1(RA) field, the A2 (TA) field, and the A 3 (SA) field may be set to STA 3, AP 1, and MLD_S, respectively. Additionally, within the link identifier element of the routed TDLS discovery request frame, the TDLS initiator STA address field, the TDLS responder STA address field, and BSSID field may be set to MLD_S, STA 3, and AP 1, respectively. The STA 3 may recognize and process the routed TDLS discovery request frame because the value in the BSSID field of the link identifier element matches AP 1 and the TDLS responder STA address field matches a MAC address of the STA 3. The STA 3 may ignore a TDLS Multi-Link element as it does not recognize the element. The STA 3 of the non-MLD 430 may respond with a TDLS discovery response frame, which may be a management frame, with both To DS subfield and From DS subfield set to 0. In the TDLS discovery response frame, the A1(RA) field is set to MLD_S, the A2 (TA) field is set to STA 3, and the A 3 (BSSID) field is set to AP 1. Additionally, within the link identifier element of the TDLS discovery response frame, the TDLS initiator STA address field, the TDLS responder STA address field, and BSSID field may be set to MLD_S, STA 3, and AP 1, respectively. The STA 1, which is a TDLS STA affiliated with the non-AP MLD 410, may receive the TDLS discovery response frame which is sent on the TDLS direct link.

The TDLS discovery request frame in FIG. 4B may be the same as the TDLS discovery request frame in FIG. 4A, with the exception that the BSSID field in the link identifier is set to AP 2. The TDLS discovery request frame may be received at the AP MLD 420 by the AP 1 or the AP 2, and the AP MLD 420 may route the TDLS discovery frame to the STA 3 through the AP 1. In the routed TDLS discovery request frame, the BSSID field may be set to AP 2. The STA 3 of the non-MLD 430 may discard the routed TDLS discovery request frame because the value in the BSSID field of the link identifier element does not match AP 1. The STA 3 may not recognize the BSSID.

There are special kinds of multi-link operation, for example, an Enhanced Multi-Link Single-Radio (EMLSR) operation and an Enhanced Multi-Link Multi-Radio (EMLMR) operation.

The EMLSR operation enables multi-link operation with a single radio. In the EMLSR operation, a non-AP MLD may achieve throughput enhancement with reduced latency which is close to a performance with concurrent dual radio non-AP MLDs. When a non-AP MLD intends to operate in the EMLSR mode with its associated AP MLD, a STA affiliated with the non-AP MLD may transmit an EML Operating Mode Notification frame to its associated AP affiliated with the AP MLD. In the EML Operating Mode Notification frame, the EMLSR mode subfield in the EML Control field is set to 1. Upon receiving the EML Operating Mode Notification frame from the non-AP MLD, the associated AP affiliated with the AP MLD may transmit another EML Operating Mode Notification frame on any enabled link between the AP MLD and the non-AP MLD as a response. In the EML Operating Mode Notification frame transmitted as the response, the EMLSR Mode subfield is set to 1. The AP affiliated with the AP MLD may be expected to transmit the EML Operating Mode Notification in response to the EML Operating Mode Notification frame transmitted by the STA affiliated with the non-AP MLD within a timeout interval. The timeout interval may be indicated in the Transition Timeout subfield in the EML Capabilities subfield in the Basic Multi-Link element that is most recently exchanged between the AP MLD and the non-AP MLD. The non-AP MLD may transition to the EMLSR mode immediately after receiving the EML Operating Mode Notification frame, from the AP of the AP MLD, with the EMLSR Mode subfield in the EML Control field set to 1. The non-AP MLD may also transition to the EMLSR mode immediately after the timeout interval indicated in the Transition Timeout subfield in the EML Capabilities subfield in the Basic Multi-Link element elapse. The timeout interval may start after the end of the last PPDU including the EML Operating Mode Notification frame transmitted by the non-AP MLD. This transition may occur when either of the two events occurs first. Upon transitioning into the EMLSR mode, all STAs affiliated with the non-AP MLD may transition to a listening mode, for example, an active mode or in PS (power saving) mode when it is in the awake state. This process for transitioning into the EMLSR mode using the EML Operating Mode Notification frame exchanges is illustrated in FIG. 5.

Figure 5:
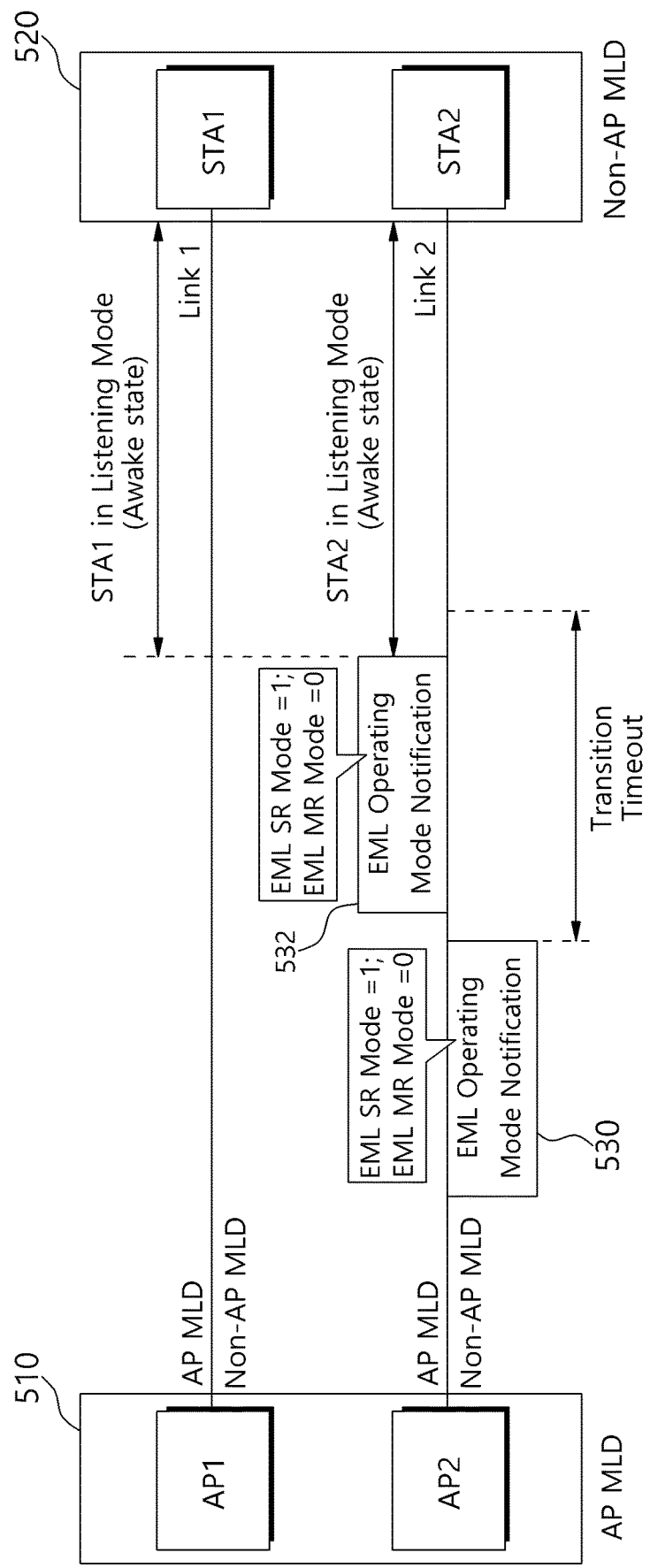
FIG. 5 shows an example of an EMLSR mode operation in accordance with an embodiment.

FIG. 5 shows an example of an EMLSR mode operation in accordance with an embodiment. The EMLSR mode operation may be applicable to IEEE 802.11be standard and any future amendments to IEEE 802.11 standard.

In FIG. 5, an AP MLD 510 may include affiliated two APs (AP 1 and AP 2), and a non-AP MLD 520 may include affiliated two STAs (STA 1 and STA 2). Two links are set up between the AP MLD 510 and the non-AP MLD 520. Specifically, Link 1 is set up between AP 1 and STA1, and Link 2 is set up between AP 2 and STA 2. In this example, both Link 1 and Link 2 are enabled links. When at least one traffic identifier (TID) associated with the non-AP MLD is mapped to a setup link in either uplink or uplink direction between the non-AP MLD and its associated AP MLD, the link is referred to as an enabled link. When the non-AP MLD 520 intends to transition to the EMLSR mode, the STA 2 may send to the AP 2 via Link 2 an EML Operating Mode Notification frame 530. In the EML Operating Mode Notification frame 530, the EMLSR Mode subfield and the EMLMR Mode subfield of the EML Control field may be set to 1 and 0, respectively. In response to the EML Operating Mode Notification frame 530 transmitted from the STA 2 of non-AP MLD 520, the AP 2 may transmit to the STA 2 via Link 2 another EML Operating Mode Notification frame 532. In the EML Operating Mode Notification frame 532, the EMLSR Mode subfield and the EMLMR Mode subfield of the EML Control field may be also set to 1 and 0, respectively. After receiving the EML Operating Mode Notification frame 532 from the AP 2 of MLD 510, the non-AP MLD 520 may transition into the EMLSR mode. Accordingly, all STAs (STA 1 and STA 2) of the non-AP MLD 520 may transition into listening mode (i.e., active mode or in PS mode when it is in the awake state).

The AP 2 affiliated with the AP MLD 510 may be expected to transmit the EML Operating Mode Notification 532 in response to the EML Operating Mode Notification frame 530 sent by the STA 2 within a timeout interval. The timeout interval may be indicated in the Transition Timeout subfield in the EML Capabilities subfield in the Basic Multi-Link element that is most recently exchanged between the AP MLD 510 and the non-AP MLD 520. The non-AP MLD 520 may transition to the EMLSR mode immediately after receiving the EML Operating Mode Notification frame 532 with the EMLSR Mode subfield in the EML Control field set to 1 from the AP 2. The non-AP MLD 520 may also transition to the EMLSR mode immediately after the timeout interval indicated in the Transition Timeout subfield in the EML Capabilities subfield in the Basic Multi-Link element elapse. The timeout interval may start after the end of the last PPDU containing the EML Operating Mode Notification frame 530 transmitted by the non-AP MLD. This transition may occur when either of the two events occurs first. Upon transitioning into the EMLSR mode, all STAs affiliated with the non-AP MLD may transition to the listening mode.

The EMLMR operation is another mode of multi-link operation. In the EMLMR mode, an MLD with multiple radio may be allowed to move part of all of transmit (TX)/receive (RX) chains of one link (e.g., a first link) to another link (e.g., a second link) within the same MLD. This may effectively increase the spatial stream capability of the second link.

Figure 6:
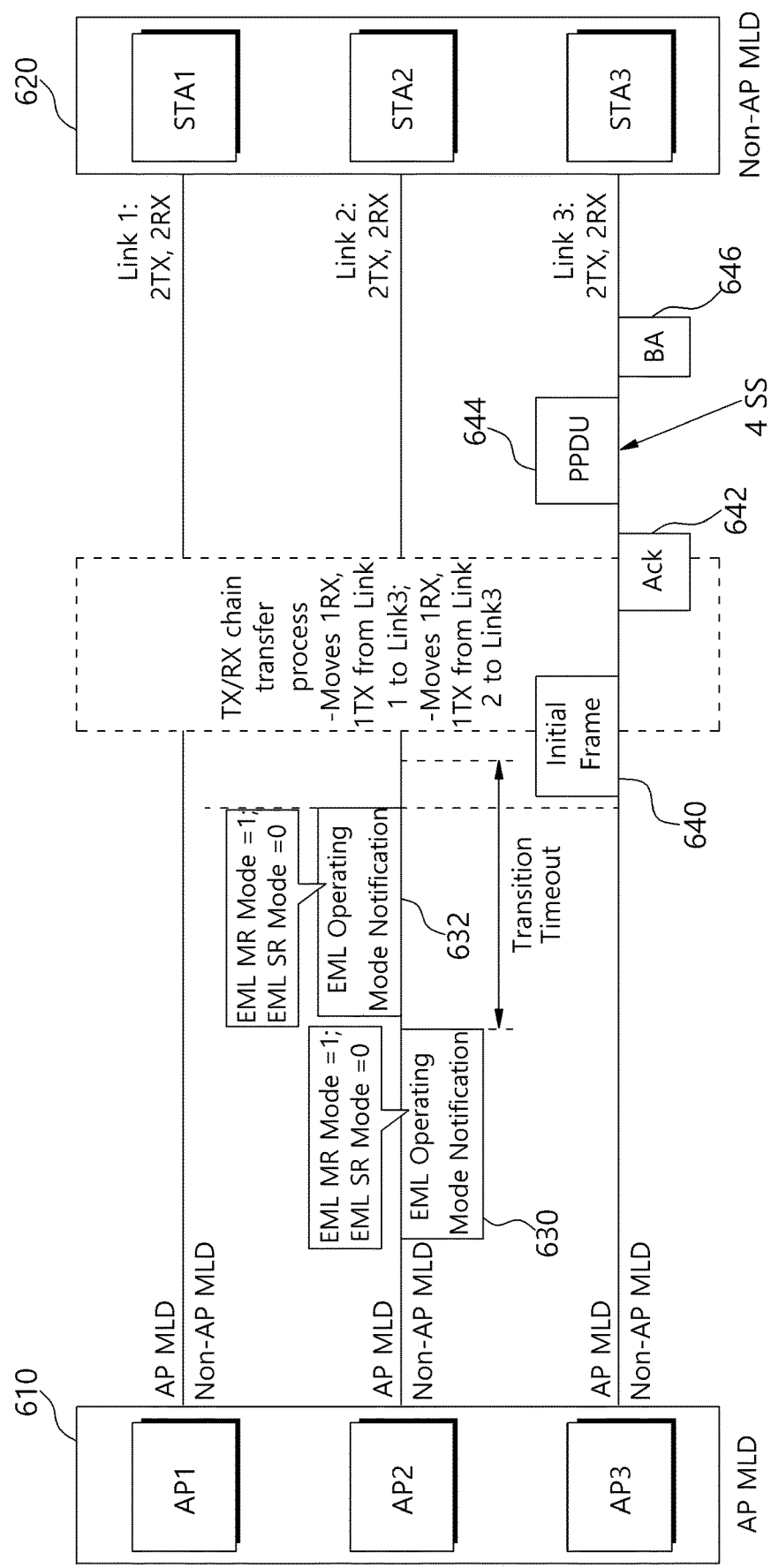
FIG. 6 shows an example of an EMLMR mode operation in accordance with an embodiment.

FIG. 6 shows an example of an EMLMR mode operation in accordance with an embodiment. The EMLSR mode operation may be applicable to IEEE 802.11be standard and any future amendments to IEEE 802.11 standard.

In FIG. 6, an AP MLD 610 may include three affiliated APs (AP 1, AP 2, and AP 3), and a non-AP MLD 620 may include three affiliated STAs (STA 1, STA 2, and STA 3). Three links may be set up between the AP MLD 610 and the non-AP MLD 620. The AP 1 and the STA 1 may operate on Link 1, the AP 2 and the STA 2 may operate on Link 2, and the AP 3 and the STA 3 may operate on Link 3. In some implementations, Link 1, Link 2, and Link 3 may be 2.4 GHz band, 5 GHz band, and 6 GHz band, respectively.

The non-AP MLD 620 may be a non-AP MLD having multi-radio and each of STA 1, STA 2, and STA 3 may have two TX chains and two RX chains. Both AP MLD 610 and non-AP MLD 620 may support the EMLMR mode. The non-AP MLD 620 may list all three links (Link 1, Link 2, and Link 3) as the EMLMR links. In the Basic Multi-Link element exchanged between the AP MLD 610 and the non-AP MLD 620, the EML Capabilities Present subfield may be set to 1 to indicate that the EML Capabilities subfield is present in the Common Info field of the Basic Multi-Link element. Both EMLMR supported number of Tx and Rx spatial steams in the EML Control field of the EML Operating Mode Notification frame may be set to the value of 4.

As shown in FIG. 6, at one point of time, the non-AP MLD 620 may send an EML Operating Mode Notification frame 630 to the AP MLD 610 via Link 2. In the EML Operating Mode Notification frame 630, the EMLMR Mode subfield in the EML Control field may be set to 1 and the EMLSR Mode subfield may be set to 0. Upon receiving the EML Operating Mode Notification frame 630 on Link 2, the AP 2 affiliated with the AP MLD 610 may transmit another EML Operating Mode Notification frame 632 to the STA 2 of the non-AP MLD 620 via Link 2. In the EML Operating Mode Notification frame 632, the EMLMR Mode subfield in the EML Control field may be set to 1 and the EMLSR Mode subfield may be set to 0. The EMLMR links may be indicated in the EMLMR Link Bitmap subfield of the EML Control field of the EML Operating Mode Notification frame 630 and 632 by setting the bit positions corresponding to the link IDs of these links in the EMLMR Link Bitmap subfield to 1. When the EML Operating Mode Notification frame 632 is received before the timeout timer indicated in the Transition Timeout subfield in the EML Capabilities subfield in the Basic Multi-Link element expires, the non-AP MLD 620 may transition into the EMLMR mode. After the non-AP MLD 620 transitions into the EMLMR mode, the AP MLD 610 may transmit an initial frame 640 via Link 3 to initiate the frame exchanges for the EMLMR operation. The initial frame may also be referred to as EMLMR initial frame in this disclosure. After receiving the initial frame 640 via Link 3, the non-AP MLD 620 may transfer 1 TX chain and 1 RX chain of Link 1 to Link 3, as well as transfer 1 TX chain and 1 RX chain of Link 2 to Link 3. After the transfer process, Link 3 may have 4 TX chains and 4 RX chains. Therefore, the STA 3 affiliated with the non-AP MLD 620 can perform transmit and receive operation using 4 spatial streams (SS) on Link 3. The value set as EMLMR supported number of Tx and Rx spatial steams in the EML Control field of the EML Operating Mode Notification frame may be 4. Then, the STA 3 affiliated with the non-AP MLD 620 may transmit an ACK frame 642 in response to the initial frame 640 sent by the AP MLD 610. The AP MLD 610 may perform subsequent PPDU 644 transmission to the non-AP MLD 620 via Link 3 using 4 spatial streams (SS). After the EMLMR frame exchange sequence, the STAs affiliated with the non-AP MLD 620 may be able to perform frame exchanges based on per-link spatial stream capability.

The current single TDLS link discovery and setup process, as defined in the IEEE 802.11 standard, does not function properly in the EMLMR mode. For example, in the EMLMR mode, when the non-AP MLD acts as a TDLS initiator and a legacy device functions as a TDLS responder, the TDLS discovery response may be transmitted over a link that is part of the EMLMR links and the non-AP MLD may be involved in the EMLMR frame exchanges on another link. In this scenario, the non-AP MLD in the EMLMR mode may not have any available radio left for the link on which the response frame is transmitted by the TDLS responder.

Figure 7A:
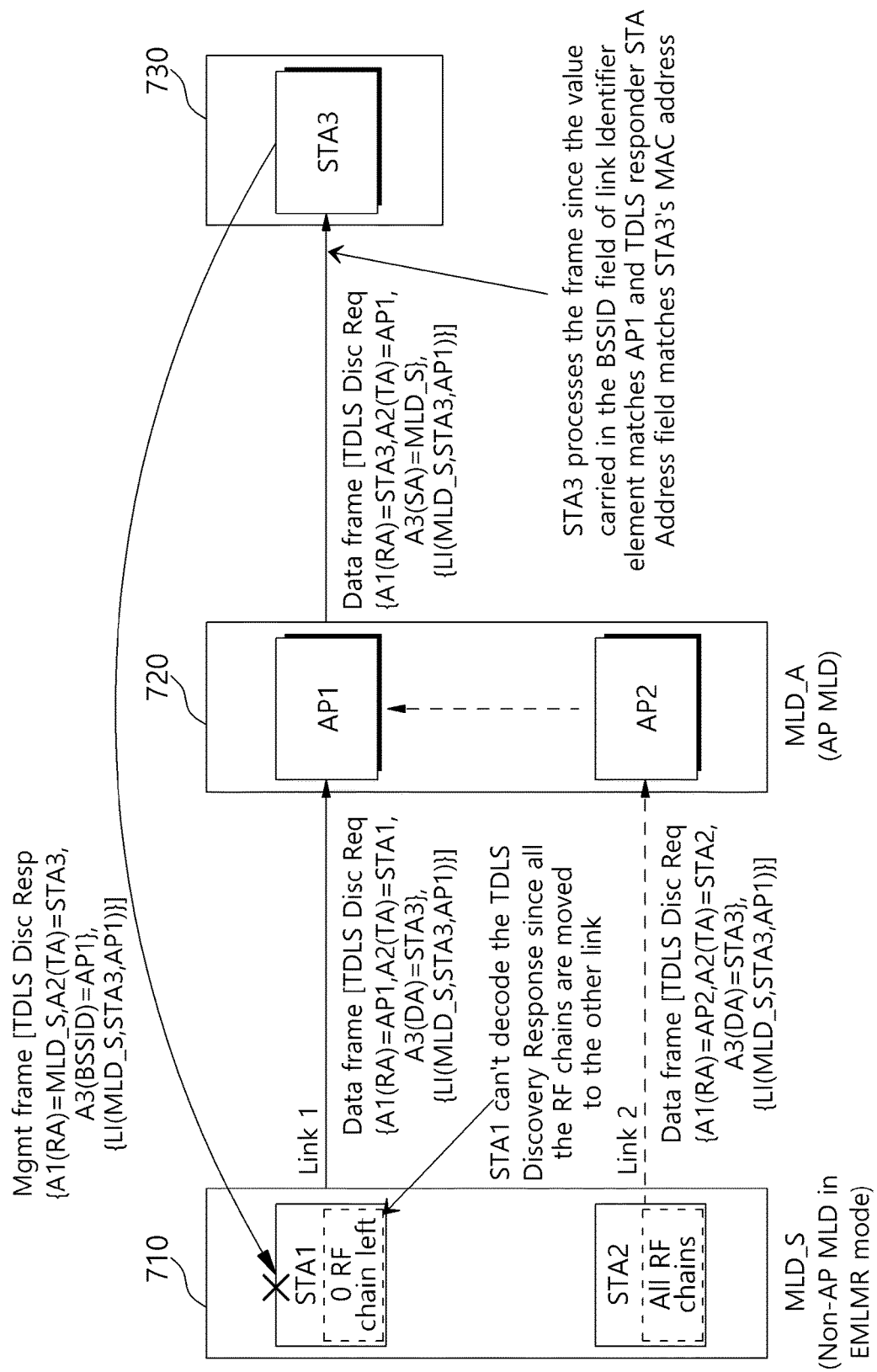
FIGS. 7A and 7B show another examples of a TDLS discovery process in accordance with an embodiment.
Figure 7B:
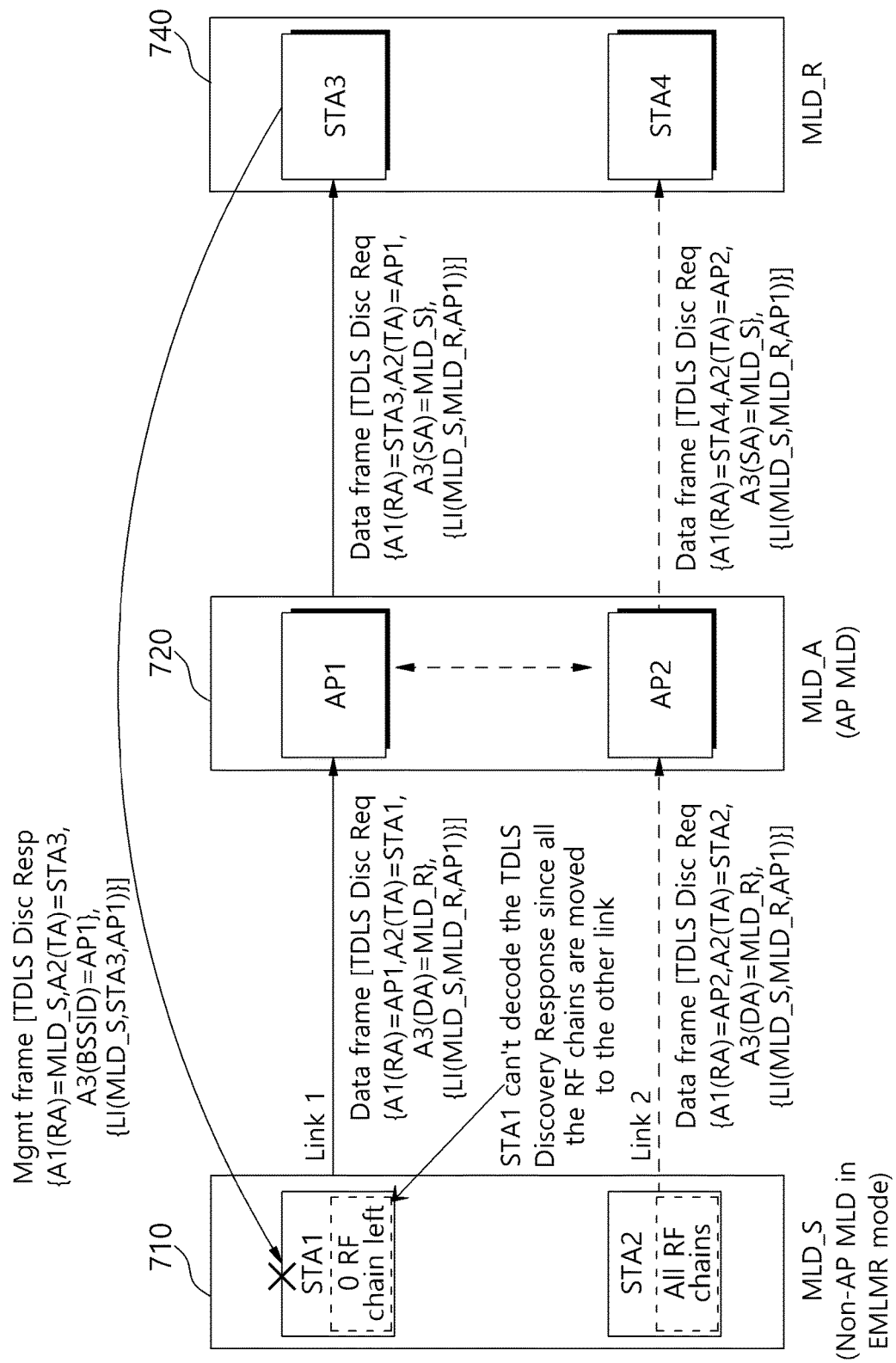

FIGS. 7A and 7B show another examples of a TDLS discovery process in accordance with an embodiment. These examples may be applicable to IEEE 802.11be standard and any of future amendments to IEEE 802.11 standard.

The example illustrated in FIG. 7A may be similar to the example of FIG. 4, with the exceptions described below. For instance, the non-AP MLD 710 in FIG. 7A operates in the EMLMR mode, while the non-AP MLD 410 in FIG. 4A does not support or does not operate in the EMLMR mode.

In FIG. 7A, the non-AP MLD 710 may be not aware of the link on which the STA 3 of non-MLD 730 would transmit the TDLS discovery response frame in response to the TDLS discovery request frame transmitted by the non-AP MLD 710. The STA 3 may transmit the TDLS discovery response frame on Link 1. However, the non-AP MLD 710 in the EMLMR mode may have moved the radio and all RF chains (TX/RX chains) of Link 1 to Link 2. Therefore, in this situation, the non-AP MLD 710 may not be able to decode or process the TDLS discovery response frame transmitted from the STA 3. The same or similar situation may take place when the TDLS responder operates on either link.

The example of FIG. 7B may be similar to the example of FIG. 7A, with the exceptions described below. For instance, the TDLS responder in FIG. 7B is a non-AP MLD 740 which includes two affiliated STAs (STA 3 and STA 4). In this example, within TDLS discovery request frame transmitted on Link 1, the A 3 (DA) field is set to the non-AP MLD 740 (MLD_R) instead of the STA 3 in FIG. 7A, and within the link identifier element of the TDLS discovery request frame, the TDLS responder STA address field may be set to the non-AP MLD 740 (MLD_R) instead of the STA 3 in FIG. 7A. Additionally, the AP 2 of the AP MLD 720 may route the TDLS discovery request frame to STA 4 affiliated with the non-AP MLD 740 (MLD_R). The routed TDLS discovery request frame may be discarded because the value in the BSSID field of the link identifier element does not match AP 2. In the example of the FIG. 7B, the non-AP MLD 710, the TDLS initiator, is not aware of the link on which the non-AP MLD 740, the TDLS responder, would transmit the TDLS discovery response frame in response to the TDLS discovery request frame sent by the non-AP MLD 710. The STA 3 of the non-AP MLD 730 may transmit the TDLS discovery frame on Link 1. However, the non-AP MLD 710 in the EMLMR mode may have moved the radio and all RF chains (TX/RX chains) of Link 1 to Link 2. Therefore, the non-AP MLD 710 may not be able to decode or process the TDLS discovery response frame transmitted from the STA 3 of the non-AP MLD 740.

If a non-AP MLD is the TDLS initiator and all the TDLS discovery request frames are sent on one link (for example, a first link) for discovering TDLS peer STA on different links, it is possible that the TDLS peer STA, a TDLS responder, may transmit the TDLS discovery response frame on a second link. However, as explained in FIGS. 7A and 7B, in the EMLMR mode, the non-AP MLD may not have available RF chains left on the second link. Therefore, the non-AP MLD may not be able to decode or process the TDLS discovery response frame and therefore cannot discover the TDLS peer STA (the TDLS responder).

Figure 8A:
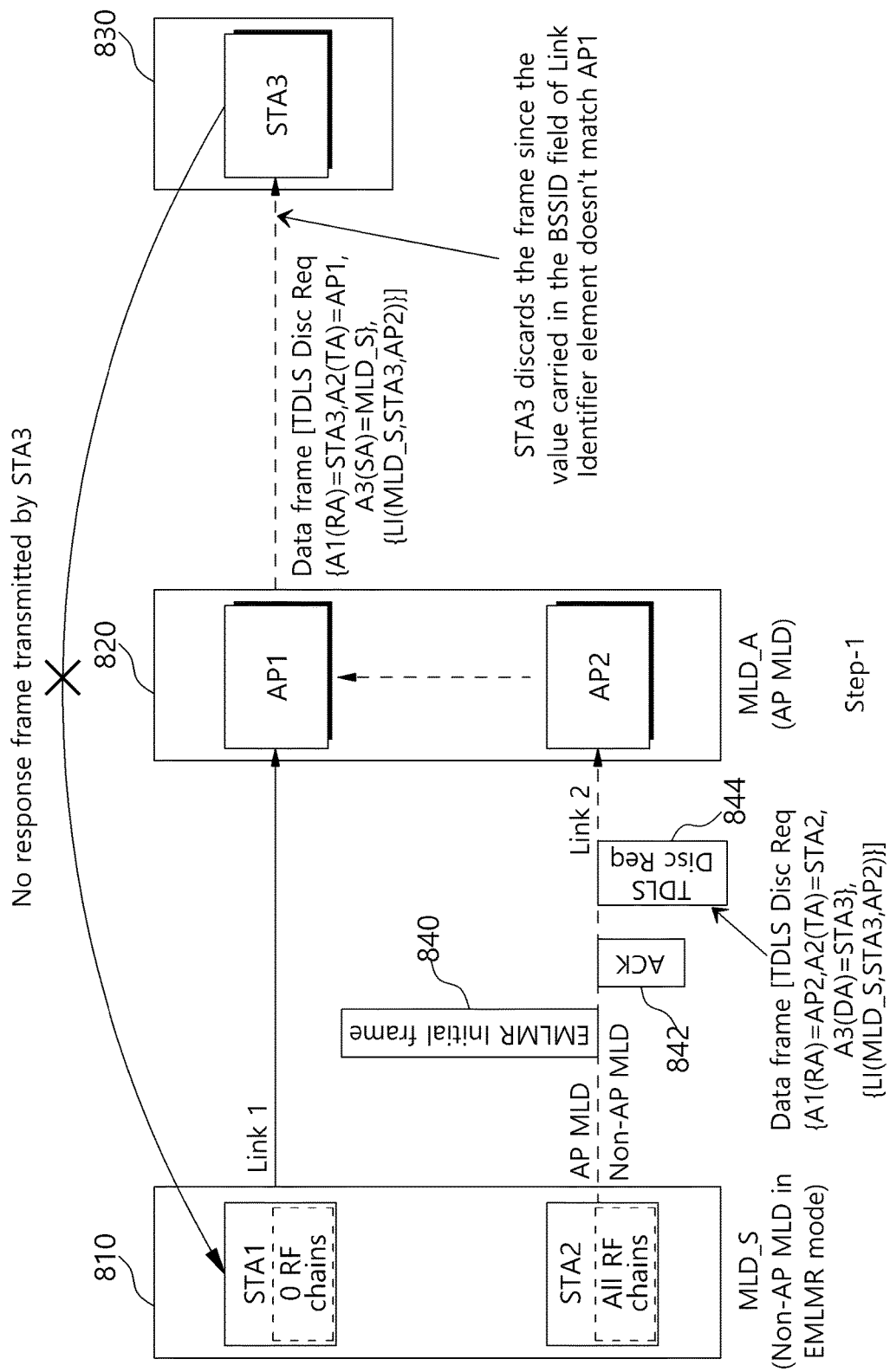
FIGS. 8A and 8B show another example of a TDLS discovery process in accordance with an embodiment.
Figure 8B:
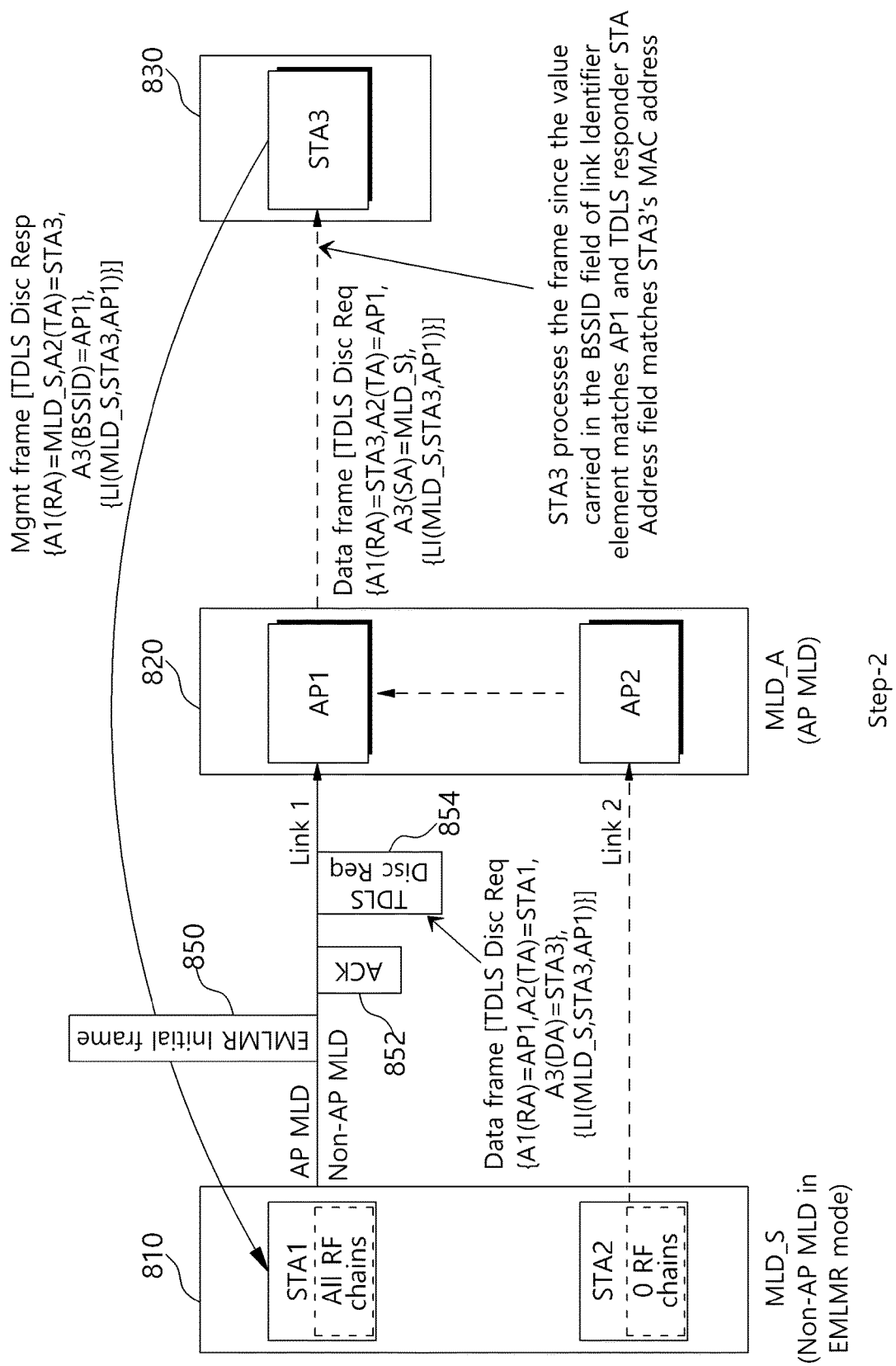

FIGS. 8A and 8B show another example of a TDLS discovery process in accordance with an embodiment. These examples may be applicable to IEEE 802.11be standard and any of future amendments to IEEE 802.11 standard.

In FIGS. 8A and 8B, the TDLS discovery process may be initiated by a non-AP MLD 810 which includes two affiliated STAs (STA 1 and STA 2). Two links (Link 1 and Link 2) may be set up between the non-AP MLD 810 and an AP MLD 820 which includes two affiliated APs (AP 1 and AP 2). The STA 1 and the AP 1 may operate on Link 1 and the STA 2 and the AP 2 may operate on Link 2. Additionally, a non-MLD 830 may include STA 3, and the STA 3 may be associated with the AP 1 of the AP MLD 820.

In an embodiment, when a non-AP MLD in the EMLMR mode intends to discover a TDLS peer STA using the EMLMR links, the non-AP MLD may sequentially and separately transmit the TDLS discovery request frames on different links of the EMLMR links. That is, each TDLS discovery request frame may be transmitted on a separate link to discover the TDLS peer STA.

FIG. 8A illustrates a first step (Step-1) for discovering TDLS discovery process in accordance with an embodiment. In FIG. 8A, the non-AP MLD 810 (MLD_S) may be a TDLS initiator and operates in the EMLMR mode. Once the non-AP MLD 810 transitions into the EMLMR mode, the AP 2 of the AP MLD 820 may transmit an EMLMR initial frame (or initial frame) 840 on Link 2 to initiate frame exchanges for the EMLMR operation. Then, the non-AP 810 may transfer all TX/RX chains of Link 1 to Link 2. Once the STA 2 receives the EMLMR initial frame 840 on Link 2, the STA 2 may transmit an ACK frame 842. Then, the STA 2 of the non-AP MLD 810 may transmit a TDLS discovery request frame 844 for discovering TDLS peer STAs, via Link 2, to the AP 2 of the AP MLD 820. The TDLS discovery request frame 844 may be a data frame. Within the TDLS discovery request frame 844, the A1(RA) field, the A2 (TA) field, and the A 3 (DA) field may be set to AP 2, STA 2, and STA 3, respectively. Additionally, within the link identifier element of the first TDLS discovery request frame 844, the TDLS initiator STA address field, the TDLS responder STA address field, and BSSID field may be set to MLD_S, STA 3, and AP 2, respectively. The TDLS discovery request frame 844 may be received by the AP 2 of the AP MLD 820, and the AP MLD 820 may route the TDLS discovery request frame 844 to the STA 3 through the AP 1. In the routed TDLS discovery request frame, the A1(RA) field, the A2 (TA) field, and the A 3 (SA) field may be set to STA 3, AP 1, and MLD_S, respectively. Additionally, within the link identifier element of the routed TDLS discovery request frame, the TDLS initiator STA address field, the TDLS responder STA address field, and BSSID field may be set to MLD_S, STA 3, and AP 2, respectively. The STA 3 may discard the routed TDLS discovery request frame because the value in the BSSID field of the link identifier element does not matches AP 1. The STA 3 may not recognize the BSSID. Therefore, the non-AP MLD 810 may not receive any TDLS discovery response frame from the STA 3.

Then, the non-AP MLD 810 may transmit another TDLS discovery request frame via Link 1 to the AP MLD 820. In some implementations, in the EMLMR mode, when the AP MLD receives the TDLS discovery request frame on a first link from the non-AP MLD which triggers the TDLS discovering process, the AP MLD 820 may transmit an EMLMR initial frame on the other links subsequently to facilitate that the non-AP MLD transmits the TDLS discovery request frame on other links and be able to discover the TDLS peer STAs on the other links.

FIG. 8B illustrates a second step (Step-2) for discovering TDLS discovery process in accordance with an embodiment. As shown in FIG. 8B, the AP 1 of AP MLD 820 may transmit an EMLMR initial frame 850 to the STA 1 on Link 1. In response, the STA 1 may transmit an ACK frame 852 and then a TDLS discovery request frame 854 to the AP 1 on Link 1. The TDLS discovery request frame 854 may be a data frame. Within the TDLS discovery request frame 854, the A1(RA) field, the A2 (TA) field, and the A 3 (DA) field may be set to AP 1, STA 1, and STA 3, respectively. Additionally, within the link identifier element of the TDLS discovery request frame 854, the TDLS initiator STA address field, the TDLS responder STA address field, and BSSID field may be set to MLD_S, STA 3, and AP 1, respectively. The TDLS discovery request frame 854 may be received by the AP 1 of the AP MLD 820, and the AP MLD 820 may route the TDLS discovery request frame 854 to the STA 3 through the AP 1. In the routed second TDLS discovery request frame, the A1(RA) field, the A2 (TA) field, and the A 3 (SA) field may be set to STA 3, AP 1, and MLD_S, respectively. Additionally, within the link identifier element of the routed TDLS discovery request frame, the TDLS initiator STA address field, the TDLS responder STA address field, and BSSID field may be set to MLD_S, STA 3, and AP 1, respectively. Once the STA 3 receives the routed TDLD discovery request frame, it may process and decode it since the value in the BSSID field of the link identifier element matches AP 1 and the TDLS responder STA address field matches STA 3's MAC address. The STA 3 may transmit a TDLS discovery response frame to the STA 1. The TDLS discovery response frame may be a management frame. Within the TDLS discovery response frame, the A1(RA) field, the A2 (TA) field, and the A 3 (BSSID) field may be set to MLD_S, STA 3, and AP 1, respectively. Additionally, within the link identifier element of the TDLS discovery response frame, the TDLS initiator STA address field, the TDLS responder STA address field, and BSSID field may be set to MLD_S, TA 3, and AP 1, respectively.

FIG. 9 shows an example of a process 900 for the TDLS discovery process in accordance with an embodiment.

In operation 910, a non-AP MLD is operating in the EMLMR mode and it may intend to discover TDLS peer STAs and establish TDLS direct links using at least one of the links that are set up with an associated AP MLD.

In operation 920, when the non-AP MLD intends to discover TDLS peer STAs and establish TDLS direct links on one of its links, the non-AP MLD may transmit a first TDLS discovery request frame on a first link to the associated AP MLD. Then, the non-AP MLD may transmit sequentially another TDLS discovery request frames on the other links to the AP MLD as explained below.

In operation 930, the non-AP MLD may subsequently transmit a second TDLS discovery request frame to the AP MLD on a second link.

In operation 940, when the non-AP MLD has set up more than two links with the associated AP MLD, the non-AP MLD may transmit another TDLS discovery request frames sequentially and separately on corresponding links.

In operation 950, the non-AP MLD may receive a TDLS discovery response frame on at least one link on which the non-AP MLD has transmitted the TDLS discovery request frames.

Figure 10A:
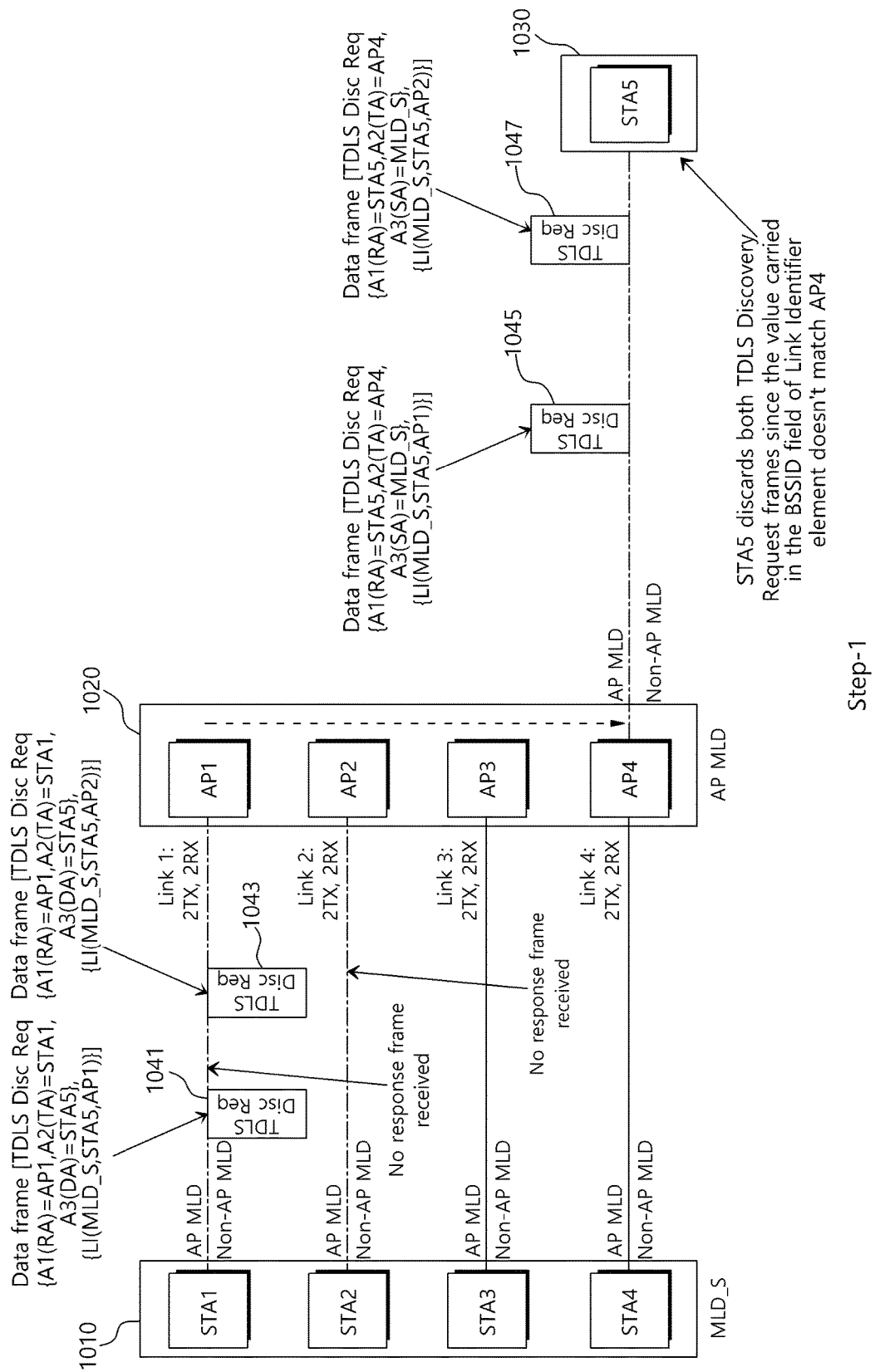
FIGS. 10A to 10C show another example of a TDLS discovery process in accordance with an embodiment.
Figure 10B:
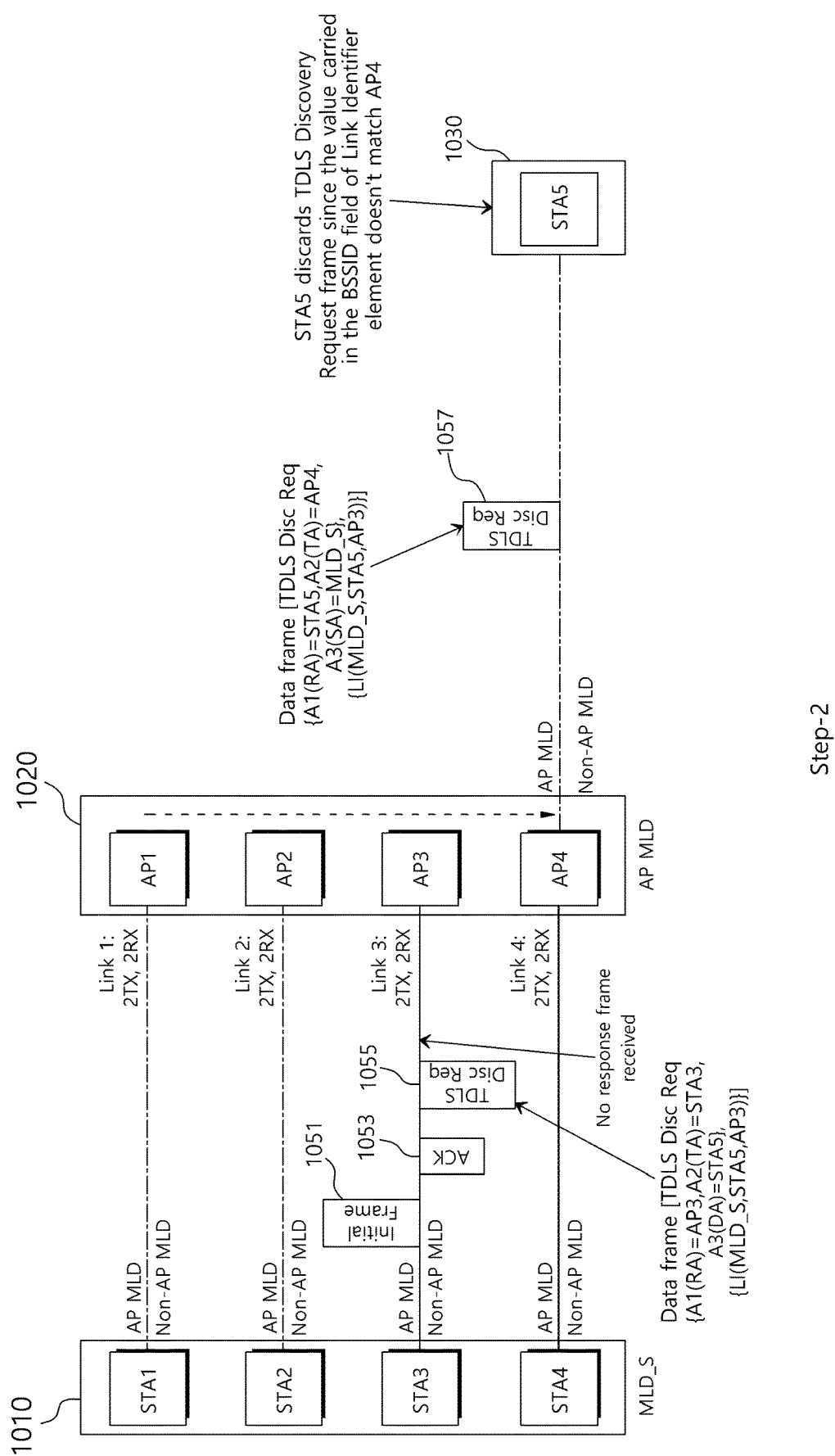
Figure 10C:
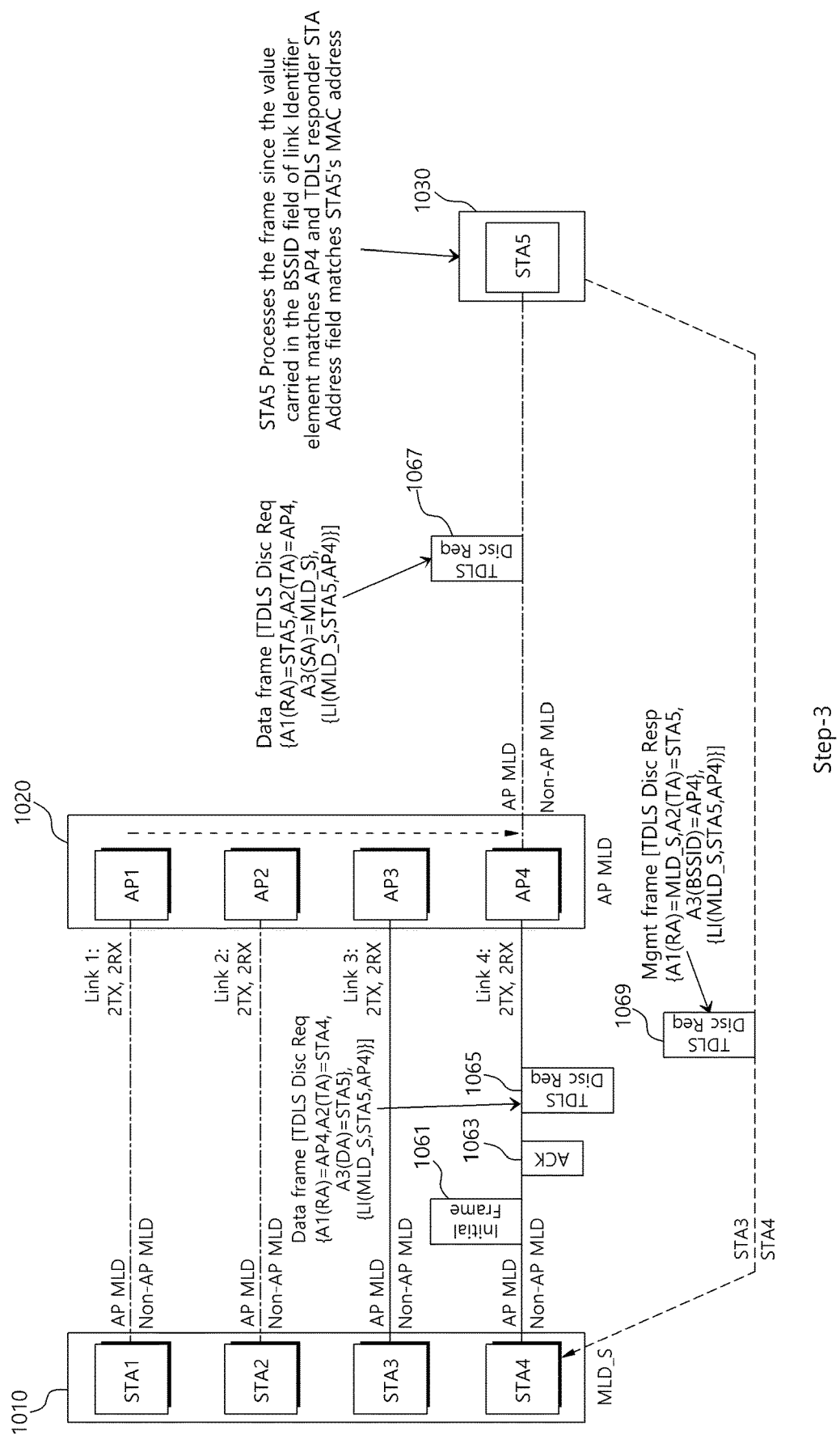

FIGS. 10A to 10C show another example of a TDLS discovery process in accordance with an embodiment. This example may be applicable to IEEE 802.11be standard and any of future amendments to IEEE 802.11 standard. FIGS. 10A to 10C illustrate a process to discover TDLS peer STAs by a non-AP MLD operating in the EMLMR mode. The non-AP MLD may transmit TDLS discovery request frames on the EMLMR links sequentially and separately in order to discover the TDLS peer STAs on the corresponding EMLMR links.

In FIGS. 10A to 10C, a non-AP MLD (MLD_S) 1010 may include four affiliated STAs (STA 1, STA 2, STA 3, and STA 4). Similarly, an AP MLD 1020 may include four affiliated APs (AP 1, AP 2, AP 3, and AP 4). Four links (Link 1, Link 2, Link 3, and Link 4) may be set up between the non-AP MLD 1010 and the AP MLD 1020. Specifically, the STA 1 and the AP 1 may operate on Link 1, the STA 2 and the AP 2 may operate on Link 2, the STA 3 and the AP 3 may operate on Link 3, and the STA 4 and the AP 4 may operate on Link 4. Each of the links (Link 1, Link 2, Link 3, and Link 4) may have 2 TX chains and 2 RX chains. Additionally, Link 3 and Link 4 may form a pair of the EMLMR links, while Link 1 and Link 2 are not EMLMR links. A non-MLD 1030 may include an affiliated STA 5 and may be associated operate with AP 4 of the AP MLD 1020.

FIG. 10A illustrates a first step (Step-1) for discovering a TDLS peer STA in accordance with an embodiment. As shown in FIG. 10A, the non-AP MLD 1010 may transmit multiple TDLS discovery request frames via a single link to the AP MLD 1020. The single link may be a non-EMLMR link. For example, the STA 1 of non-AP MLD 1010 may transmit a first TDLS discovery request frame 1041 via Link 1 to the AP 1 of AP MLD 1020. The first TDLS discovery request frame 1041 may be a data frame. Within the first TDLS discovery request frame 1041, the A1(RA) field, the A2 (TA) field, and the A 3 (DA) field may be set to AP 1, STA 1, and STA 5, respectively. Additionally, within the link identifier element of the first TDLS discovery request frame 1041, the TDLS initiator STA address field, the TDLS responder STA address field, and BSSID field may be set to MLD_S, STA 5, and AP 1, respectively. The first TDLS discovery request frame 1041 may be received by the AP 1 of AP MLD 1020, and the AP MLD 1020 may route the first TDLS discovery request frame 1041 to the STA 5 through the AP 4. The routed first TDLS discovery request frame 1045 may be a data frame. In the routed first TDLS discovery request frame 1045, the A1(RA) field, the A2 (TA) field, and the A 3 (SA) field may be set to STA AP 4, and MLD_S. Furthermore, within the link identifier element of the routed first TDLS discovery request frame 1045, the TDLS initiator STA address field, the TDLS responder STA address field, and BSSID field may be set to MLD_S, STA 5, and AP 1, respectively. The STA 5 of non-MLD 1030 may discard the routed first TDLS discovery request frame 1045 because the value in the BSSID field of the link identifier element does not match AP 4, and it may fail to recognize the BSSID. Therefore, the non-AP MLD 1010 may not receive any response frame from the STA 5 as a response to the first TDLS discovery request frame 1041.

Since the STA 1 of non-AP MLD 1010 has not received any response frame in response to the first TDLS discovery request frame 1041, the STA 1 of non-AP MLD 1010 may transmit a second TDLS discovery request frame 1043 via Link 1 to the AP 1 of AP MLD 1020. The second TDLS discovery request frame 1043 may also be a data frame. Within the second TDLS discovery request frame 1043, the A1(RA) field, the A2 (TA) field, and the A 3 (DA) field may be set to AP 1, STA 1, and STA 5, respectively. Additionally, within the link identifier element of the second TDLS discovery request frame 1043, the TDLS initiator STA address field, the TDLS responder STA address field, and BSSID field may be set to MLD_S, STA 5, and AP 2, respectively. The difference between the first and second TDLS discovery request frames is the BSSID field in the link identifier element. That is, the BSSID field in the link identifier element of the second TDLS discovery request frame 1043 is AP 2, while the BSSID field in the link identifier element of the first TDLS discovery request frame 1041 is AP 1. The second TDLS discovery request frame 1043 may be received by the AP 1 of AP MLD 1020, and the AP MLD 1020 may route the second TDLS discovery request frame 1043 to the STA 5 through the AP 4. The routed second TDLS discovery request frame 1047 may be a data frame. In the routed second TDLS discovery request frame 1047, the A1(RA) field, the A2 (TA) field, and the A 3 (SA) field may be set to STA 5, AP 4, and MLD_S, respectively. Furthermore, within the link identifier element of the routed second TDLS discovery request frame 1047, the TDLS initiator STA address field, the TDLS responder STA address field, and BSSID field may be set to MLD_S, STA 5, and AP 2, respectively. The STA 5 of non-MLD 1030 may also discard the routed second TDLS discovery request frame 1047 because the value in the BSSID field of the link identifier element does not match AP 4. The STA may fail to recognize the BSSID. Therefore, the non-AP MLD 1010 may not receive any response frame from the STA 5 as a response to the second TDLS discovery request frame 1043.

FIG. 10B illustrates a second step (Step-2) for discovering a TDLS peer STA in accordance with an embodiment. As explained, Link 3 and Link 4 are a pair of the EMLMR links. When the non-AP MLD 1010 transitions into the EMLMR mode, the AP 3 of AP MLD 1020 may transmit an initial frame (or EMLMR initial frame) 1051 via Link 3 to initiate the frame exchanges for the EMLMR operation. The STA 3 of non-AP MLD 1010 may transmit an ACK frame 1053 in response to the initial frame 1051. As explained referring to FIG. 6, the non-AP MLD 1010 may move part or all of TX chains and RX chains of Link 4 to Link 3. Therefore, the non-AP MLD 1010 may transmit or receive frames on Link 3 with the number of spatial streams up to the value as indicated in the EML Control field of the EML Operating Mode Notification frame. Then, the STA 3 may transmit a third TDLS discovery request frame 1055 via Link 3 to the AP 3 of AP MLD 1020. The third TDLS discovery request frame 1055 may be a data frame. Within the third TDLS discovery request frame 1055, the A1(RA) field, the A2 (TA) field, and the A 3 (DA) field may be set to AP 3, STA 3, and STA 5, respectively. Additionally, within the link identifier element of the third TDLS discovery request frame 1055, the TDLS initiator STA address field, the TDLS responder STA address field, and BSSID field may be set to MLD_S, STA 5, and AP 3, respectively. The third TDLS discovery request frame 1055 may be received by the AP 3 of AP MLD 1020, and the AP MLD 1020 may route the third TDLS discovery request frame 1055 to the STA 5 of non-MLD 1030 through the AP 4. The routed third TDLS discovery request frame 1057 may be a data frame. In the routed third TDLS discovery request frame 1057, the A1(RA) field, the A2 (TA) field, and the A 3 (SA) field may be set to STA 5, AP 4, and MLD_S, respectively. Furthermore, within the link identifier element of the routed third TDLS discovery request frame 1057, the TDLS initiator STA address field, the TDLS responder STA address field, and BSSID field may be set to MLD_S, STA 5, and AP 3, respectively. The STA 5 of non-MLD 1030 may discard the routed third TDLS discovery request frame 1057 because the value in the BSSID field of the link identifier element does not match AP 4. The STA 5 may not recognize the BSSID. Therefore, the non-AP MLD 1010 may not receive any response frame from the STA 5 as a response to the third TDLS discovery request frame 1055.

FIG. 10C illustrates a third step (Step-3) for discovering a TDLS peer STA in accordance with an embodiment. As explained, Link 3 and Link 4 are a pair of the EMLMR links. The AP MLD 1020 may transmit initial frame 1061 via Link 4 to the non-AP MLD 1010. In some implementations, when an AP MLD receive a TDLS discovery request frame from a non-AP MLD via one of EMLMR links as an indication of triggering the TDLS discovery process, the AP MLD may transmit another initial frames to other links subsequently to facilitate that the non-AP MLD transmit the TDLS discovery request frame on other links. In the example of FIG. 10C, the AP 4 of the AP MLD 1020 may transmit an initial frame (or EMLMR initial frame) 1061 via Link 4 to initiate the frame exchanges for the EMLMR operation. The STA 4 of non-AP MLD 1010 may transmit an ACK frame 1063 in response to receiving the initial frame 1061. The non-AP MLD 1010 may move part or all of TX chains and RX chains of Link 3 to Link 4. Therefore, the non-AP MLD 1010 may transmit or receive frames on Link 4 with the number of spatial streams up to the value as indicated in the EML Control field of the EML Operating Mode Notification frame. Then, the STA 4 may transmit a fourth TDLS discovery request frame 1065 via Link 4 to the AP 4 of AP MLD 1020. The fourth TDLS discovery request frame 1065 may be a data frame. Within the fourth TDLS discovery request frame 1065, the A1(RA) field, the A2 (TA) field, and the A 3 (DA) field may be set to AP 4, STA 4, and STA 5, respectively. Additionally, within the link identifier element of the fourth TDLS discovery request frame 1065, the TDLS initiator STA address field, the TDLS responder STA address field, and BSSID field may be set to MLD_S, STA 5, and AP 4, respectively. The fourth TDLS discovery request frame 1065 may be received by the AP 4 of the AP MLD 1020, and the AP MLD 1020 may route the fourth TDLS discovery request frame 1065 to the STA 5 through the AP 4. The routed fourth TDLS discovery request frame 1067 may be a data frame. In the routed fourth TDLS discovery request frame 1067, the A1(RA) field, the A2 (TA) field, and the A 3 (SA) field may be set to STA 5, AP 4, and MLD_S, respectively. Furthermore, within the link identifier element of the routed fourth TDLS discovery request frame 1067, the TDLS initiator STA address field, the TDLS responder STA address field, and BSSID field may be set to MLD_S, STA 5, and AP 4, respectively. The STA 5 of non-MLD 1030 may process and decode the routed fourth TDLS discovery request frame 1067 because the value in the BSSID field of the link identifier element matches AP 5 and the TDLS responder STA address field also matches a MAC address of the STA 5. Therefore, the STA 5 of non-MLD 1030 may transmit a TDLS discovery response frame 1069 to the STA 4 of non-AP MLD 1010. The TDLS discovery response frame 1069 may be a management frame. In the TDLS discovery response frame 1069, the A1(RA) field, the A2 (TA) field, and the A 3 (BSSID) field may be set to MLD_S, STA, and AP 4, respectively. Additionally, within the link identifier element of the TDLS discovery request frame, the TDLS initiator STA address field, the TDLS responder STA address field, and BSSID field may be set to MLD_S, STA 5, and AP 4, respectively. The STA 4, which is a TDLS STA affiliated with the non-AP MLD 1010, may receive the TDLS discovery response frame which is transmitted on the TDLS direct link.

In some embodiments, when a non-AP MLD in the EMLMR mode intends to discover TDLS peer STAs, the non-AP MLD may disable the EMLMR mode. The non-AP MLD may subsequently transmit separate TDLS discovery request frames to the AP MLD to discover TDLS peer STAs on different links.

In some embodiments, when the AP MLD receives the first TDLS discovery request frame from the non-AP MLD in the EMLMR mode on a first link, the AP MLD may wait for a specified threshold amount of time before transmitting the EMLMR initial frame on a second link. The EMLMR initial frame may enable the non-AP MLD to discover TDLS peer STA on the second link. In some implementations, the specific threshold amount of time may be an amount of time indicated by the dot11TDLSDiscoveryRequestWindow DTIM interval. It would provide enough time for the STA affiliated with the non-AP MLD to receive a TDLS discovery response frame on the first link if the TDLS responder STA or MLD transmits the TDLS discovery response frame on the first link.

In some embodiments, when an AP MLD receives a first TDLS discovery request frame on a first link, the AP MLD may ensure that the AP MLD does not initiate a long frame exchange sequence on the first link. Accordingly, the non-AP MLD may get a chance to transmit a second TDLS discovery request frame on the second link. In some implementations, before the AP MLD transmits an EMLMR initial frame on the second link, a timer may start upon receiving the first TDLS discovery request frame by the AP MLD on the first link. Once the timer expires, the AP MLD may transmit the EMLMR initial frame on the second link.

In some embodiments, after the non-AP MLD transmits the first TDLS discovery request frame on the first link, the non-AP MLD may transmit a notification message to the AP MLD to switch TDLS discovery link to another link. For example, when the non-AP MLD has not received a TDLS discovery response frame on the first link as a response to the first TDLS discovery request frame, the non-AP MLD may try to transmit the second TDLS discovery request frame on the second link. The notification message may act as a request to the AP MLD to switch TDLS discovery link from the first link to the second link. The TDLS discovery link switch may be initiated by transmitting an EMLMR initial frame on the second link. In some implementations, the AP MLD may continue any remaining frame exchange in the second link. On the second link, the non-AP MLD may transmit the second TDLS discovery request frame to discover a TDLS peer STA on the second link. The notification message may act as TDLS discovery link switch request. The notification message may be in the form of Action frame, A-Control subfield, or any other frame or element.

Figure 11:
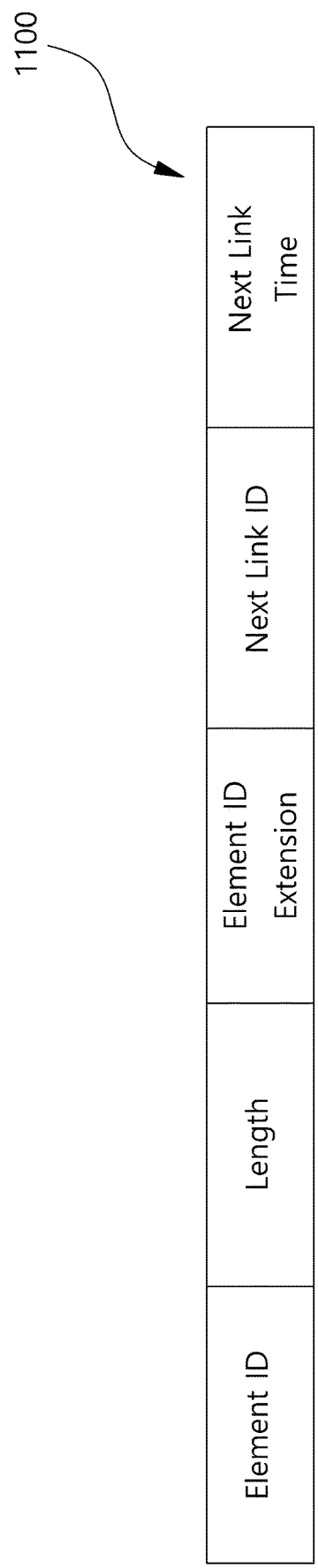
FIG. 11 shows an example of a notification message element in accordance with an embodiment.

FIG. 11 shows an example of a notification message element in accordance with an embodiment.

As shown in FIG. 11, the notification message element 1100 may include an Element ID field, a length field, an Element ID Extension field, a Next Link ID field, and a Next Link Time field. The Element ID field and the Element ID Extension field may include information to identify the notification message element 1100. The Length field may indicate the length of the notification message element 1100. The Next Link ID field may indicate a link ID on which the non-AP MLD requests the AP MLD to transmit the EMLMR initial frame so that a frame exchange may occur on the request link. The Next Link Time field may indicate a timing information at which the AP MLD may transmit the EMLMR initial frame on the requested link indicated in the Next Link ID field. In some implementations, the timing information may represent a time after which the AP MLD can transmit the EMLMR initial frame on the requested link.

In some embodiments, when a non-AP MLD that supports the EMLMR mode is a TDLS peer STA, the non-AP MLD in the EMLMR mode may keep at least one TX chain and one RX chain on each of the EMLMR links during the EMLMR operation. This may enable the non-AP MLD to discover another TDLS peer STA. For example, it may enable the non-AP MLD to receive the TDLS discovery response frame on any EMLMR links. In some implementations, the non-AP MLD may keep a fixed number of TX chains and RX chains on each link during the EMLMR mode. The fixed number of TX/RX chains may be indicated in the EMLMR setup process, TDLS setup process, or EML capabilities indication process.

In some embodiments, when the non-AP MLD is operating in the EMLMR mode and initiates a TDLS discovery/setup process, for example, by transmitting a TDLS discovery request frame to a peer STA or a peer non-AP MLD through an associated AP MLD, the non-AP MLD may keep at least one TX chain and at least one RX chain on each of the EMLMR links during the EMLMR mode in order to enable the non-AP MLD to discover another TDLS peer STA or peer non-AP MLD. Accordingly, the AP MLD may perform EMLMR frame exchanges using a reduced number of spatial streams compared to the agreed number during the EML capabilities indication process. In some implementations, the non-AP MLD may keep a fixed number of TX chains and RX chains on each link during the EMLMR operation. This fixed number may be indicated as an EMLMR setup process, TDLS setup process, or EML capabilities indication process.

In some embodiments, when a non-AP MLD triggers the TDLS discovery process, the AP MLD and the non-AP MLD may use (N−x) spatial streams for frame exchanges on any EML links, where N is the maximum number of spatial streams for the EMLMR operation as indicated during the EMLMR setup/capability indication process, x may be any positive integer such that N>x. If this approach is adopted, the EMLMR device may not need to transmit the TDLS discovery request frames separately on different links. The TDLS discovery request frame may be transmitted over one or more links, while the TDLS discovery response frame may be received on respective link on which the TDLS discovery is intended because there are at least x number of spatial streams on each link. In particular case, the x may be equal to 1.

In some embodiments, when the non-AP MLD is operating in the EMLMR mode and initiates a TDLS discovery/setup process, for example, by transmitting a TDLS discovery request frame to a peer STA or a peer non-AP MLD through an associated AP MLD on a first link, the AP MLD may not transmit an EMLMR initial frame on a second link between the AP MLD and the non-AP MLD unless any of the following conditions are met: i) the AP MLD receives some indication from the non-AP MLD, indicating that the non-AP MLD has completed the discovery process on the first link, and ii) a specific amount of time indicated by a threshold has elapsed since the AP MLD receives the TDLS discovery request frame on the first link. In some implementations, additional conditions may be added or omitted.

In some implementations, when the non-AP MLD is operating in the EMLMR mode and initiates a TDLS discovery/setup process, for example, by transmitting a TDLS discovery request frame to a peer STA or a peer non-AP MLD through an associated AP MLD on a first link, the AP MLD may facilitate the discovery of the TDLS peer STA/non-AP MLD on the second link by transmitting an EMLMR initial frame on a second link. In some implementations, the AP MLD may transmit the EMLMR initial frame on the second link when any of the following conditions are met: i) the AP MLD receives an indication from the non-AP MLD, indicating that the non-AP MLD intends to discover TDLS peer STA/non-AP MLD on the second link, and ii) a specific time of amount indicated by a threshold has elapsed since the AP MLD receives the TDLS discovery request frame on the first link. In some implementations, additional conditions may be added or omitted. In some embodiments, the non-AP MLD may keep a fixed number of RX chains on each link during the EMLMR operation.

In some embodiments, a similar process described for the EMLMR operation in this disclosure may also be applied for the EMLSR mode of operation.

Various embodiments described for the TDLS discovery for the EMLMR mode in this disclosure may also be applicable for communication over a TDLS direct link, which is already established, by a TDLS STA affiliated with a non-AP MLD in the EMLMR mode.

In some embodiments, when a STA affiliated with a non-AP MLD has established a TDLS direct link with a TDLS peer STA, if the non-AP MLD is operating in the EMLMR mode and the TDLS direct link is established in one of the EMLMR links, a fixed number of spatial stream (x), for example x=1, may be used for communication over the TDLS direct link and the maximum number of spatial streams that may be used for the EMLMR frame exchange may be adjusted accordingly. For example, the maximum (N−x) spatial streams may be used for the EMLMR frame exchange. Where N is nominal maxim number of spatial streams that may be used for the EMLMR frame exchanges as long as the TDLS link is not torn down.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term "include," "have," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A non-access point (AP) multi-link device (MLD) associated with an AP MLD in a wireless network, the non-AP MLD comprising:
at least two stations (STAs), each STA being affiliated with the non-AP MLD; and
a processor coupled to the at least two STAs, the processor configured to:
set up enhanced multi-link multi-radio (EMLMR) links among multiple links between the non-AP MLD and the AP MLD;
operate in an EMLMR mode via the EMLMR links with the AP MLD, the EMLMR link including a first link and one or more second links;
transmit a first tunneled direct link setup (TDLS) discovery request frame to the AP MLD via the first link, the first link being set up between a first STA affiliated with the non-AP MLD and a first AP affiliated with the AP MLD; and
sequentially transmit one or more second TDLS discovery request frames to the AP MLD via the one or more second links when the non-AP MLD does not receive a TDLS discovery response frame from a TDLS peer STA in response to previously transmitted TDLS discovery request frame, wherein each second link is set up between a second STA affiliated with the non-AP MLD and a corresponding second AP affiliated with the AP MLD, and each second TDLS discovery request frame is associated with a respective one of the one or more second links.

2. The AP MLD of claim 1, wherein the processor is configured to receive an initial frame, from the AP MLD, to facilitate that the non-AP MLD transmits a second TDLS discovery request frame to the AP MLD via a second link.

3. The non-AP MLD of claim 1, wherein the processor is configured to:
receive a first initial frame from the first AP via the first link;
move part or all of transmit (TX) chains and receive (RX) chains of remaining EMLMR links to the first link; and
transmit the first TDLS discovery request frame to the AP MLD via the first link.

4. The non-AP MLD of claim 3, wherein the processor is configured to:
receive a second initial frame from a second AP affiliated with AP MLD via a second link;
move part or all of TX chains and RX chains of remaining EMLMR links to the second link; and
transmit a second TDLS discovery request frame to the AP MLD via the second link.

5. The non-AP MLD of claim 4, wherein the second initial frame is received from the second AP when a specified amount of time has lapsed since previously transmitted TDLS discovery request frame.

6. The non-AP MLD of claim 4, wherein the processor is configured to transmit a notification message to the AP MLD to request a transmission of the second initial frame when the non-AP MLD does not receive the TDLS discovery response frame from the TDLS peer STA in response to previously transmitted TDLS discovery request frame.

7. The non-AP MLD of claim 4, wherein a fixed number of TX chains and RX chains remain on each of the EMLMR links during the EMLMR mode to receive the TDLS discovery response frame from the TDLS peer STA.

8. The non-AP MLD of claim 4, wherein the second initial frame is received from the second AP when i) the AP MLD receives an indication that the non-AP MLD has completed TDLS discovery process and ii) a specified amount of time has lapsed since the previously transmitted TDLS discovery request frame.

9. The non-AP MLD of claim 1, wherein the processor is configured to receive the TDLS discovery response frame from the TDLS peer STA.

10. An access point (AP) multi-link device (MLD) associated with a non-AP MLD in a wireless network, the AP MLD comprising:
at least two APs, each AP being affiliated with the AP MLD; and
a processor coupled to the at least two APs, the processor configured to:
set up enhanced multi-link multi-radio (EMLMR) links among the multiple links between the AP MLD and the non-AP MLD;
operate in an EMLMR mode via the EMLMR links with the non-AP MLD, the EMLMR link including a first link and one or more second links;
receive a first tunneled direct link setup (TDLS) discovery request frame from the non-AP MLD via the first link, the first link being set up between a first AP affiliated with the AP MLD and a first STA affiliated with the non-AP MLD;
route the first TDLS discovery request frame to a TDLS peer STA via a link being set up between the AP MLD and the TDLS peer STA;
sequentially receive one or more second TDLS discovery request frames from the non-AP MLD via the one or more second links, wherein each second link is set up between a second AP affiliated with the AP MLD and a corresponding second STA affiliated with the non-AP MLD, and each second TDLS discovery request frame is associated with a respective one of the one or more second links; and
route the one or more second TDLS discovery request frames to the TDLS peer STA via the link being set up between the AP MLD and the TDLS peer STA.

11. The AP MLD of claim 10, wherein the processor is configured to transmit an initial frame to facilitate that the non-AP MLD transmits a second TDLS discovery request frame to the AP MLD via a second link when the AP MLD receives a TDLS discovery request frame from the non-AP MLD.

12. The AP MLD of claim 10, wherein the processor is configured to:
transmit a first initial frame to the first STA via the first link; and
receive the first TDLS discovery request frame from the non-AP MLD via the first link.

13. The AP MLD of claim 12, wherein the processor is configured to:
transmit a second initial frame to the second STA via a second link; and
receive the second TDLS discovery request frame from the non-AP MLD via the second link.

14. The AP MLD of claim 13, wherein the processor is configured to transmit the second initial frame when a specified amount of time has lapsed since previously received TDLS discovery request frame.

15. The AP MLD of claim 13, wherein the processor is configured to receive a notification message to request a transmission of the second initial frame to the second STA.

16. The AP MLD of claim 13, wherein the processor is configured to transmit the second initial frame when i) the AP MLD receives an indication that the non-AP MLD has completed TDLS discovery process and ii) a specified amount of time lapses since previously received TDLS discovery request frame.

17. The AP MLD of claim 10, wherein the processor is configured to receive an indication that the non-AP MLD has received the TDLS discovery response frame from the TDLS peer STA.

18. A non-access point (AP) multi-link device (MLD) associated with an AP MLD in a wireless network, the non-AP MLD comprising:
   at least two stations (STAs), each STA being affiliated with the non-AP MLD; and
   a processor coupled to the at least two STAs, the processor configured to:
   set up multiple links between the non-AP MLD and the AP MLD, the multiple link including a first link and one or more second links;
   operate in an EMLMR mode with the AP MLD;
   disable the EMLMR mode being operated with the AP MLD when the non-AP MLD intends to discover a tunneled direct link setup (TDLS) peer STA;
   transmit a first TDLS discovery request frame to the AP MLD via the first link, the first link being set up between a first AP affiliated with the AP MLD and a corresponding first STA affiliated with the non-AP MLD; and
   sequentially transmit one or more second TDLS discovery request frames to the AP MLD via the one or more second links when the non-AP MLD does not receive a TDLS discovery response frame from a TDLS peer STA in response to previously transmitted TDLS discovery request frame, wherein each second link is set up between a second AP affiliated with the AP MLD and a corresponding second STA affiliated with the non-AP MLD, and each second TDLS discovery request frame is associated with a respective one of the one or more second links.

19. The non-AP MLD of claim 18, wherein the processor is configured to transmit a second TDLS discovery request frame when a specified amount of time has lapsed since previously transmitted TDLS discovery request frame.

20. The non-AP MLD of claim 18, wherein the processor is configured to receive the TDLS discovery response frame from the TDLS peer STA.

* * * * *